(12) United States Patent
Citeau et al.

(10) Patent No.: US 9,798,975 B2
(45) Date of Patent: Oct. 24, 2017

(54) PRODUCTION RULE ENGINE

(71) Applicant: INTERNATIONAL BUSINESS MACHINES CORPORATION, Armonk, NY (US)

(72) Inventors: Hugues Citeau, Longeville sur Mer (FR); Adil El Ghali, Paris (FR)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 14/146,219

(22) Filed: Jan. 2, 2014

(65) Prior Publication Data

US 2014/0195473 A1 Jul. 10, 2014

(30) Foreign Application Priority Data

Jan. 8, 2013 (GB) .................................. 1300257.1

(51) Int. Cl.
*G06F 17/00* (2006.01)
*G06N 5/02* (2006.01)
*G06Q 10/10* (2012.01)
*G06N 5/04* (2006.01)
*G06Q 10/06* (2012.01)

(52) U.S. Cl.
CPC ............. *G06N 5/022* (2013.01); *G06N 5/025* (2013.01); *G06N 5/04* (2013.01); *G06Q 10/06* (2013.01); *G06Q 10/10* (2013.01)

(58) Field of Classification Search
None
See application file for complete search history.

(56) References Cited

U.S. PATENT DOCUMENTS

| 4,951,225 A * | 8/1990 | Lee ........................ G06N 5/047 706/48 |
| 5,119,470 A | 6/1992 | Highland et al. |
| 5,276,776 A | 1/1994 | Grady et al. |
| 8,812,424 B2 * | 8/2014 | Breiter ..................... G06N 5/04 706/47 |
| 2004/0083454 A1 | 4/2004 | Bigus et al. |

(Continued)

OTHER PUBLICATIONS

O-DEVICE: An Object-Oriented Knowledge Base System for OWL Ontologies—2006 Georgios Meditskos and Nick Bassiliades Department of Informatics, Aristotle University of Thessaloniki, Greece {gmeditsk, nbassili}@csd.auth.gr.*

(Continued)

*Primary Examiner* — Kakali Chaki
*Assistant Examiner* — Ababacar Seck
(74) *Attorney, Agent, or Firm* — Law Office of Jim Boice

(57) ABSTRACT

A production rules engine comprises: a class loader for loading a production rule ontology into a rule engine; a class loader for loading production rules into the rule engine, wherein a production rule comprises a rule and an action defined in the production rule ontology; instance creation logic for creating instances of production rules; a reasoner for executing the production rules and for locating an instance of a production rule having an inconsistency between an action to change the ontology and the existing ontology and for executing the production rules after inconsistencies have been fixed; a constraint engine for locating a solution to an inconsistent ontology; and a fixer for updating the inconsistent ontology with the located solution.

18 Claims, 27 Drawing Sheets

(56) References Cited

U.S. PATENT DOCUMENTS

| | | | |
|---|---|---|---|
| 2005/0246301 A1 | 11/2005 | Lin et al. | |
| 2006/0173994 A1* | 8/2006 | Emeis | G06F 9/5044 |
| | | | 709/224 |
| 2008/0288235 A1 | 11/2008 | Dettinger et al. | |
| 2009/0157586 A1* | 6/2009 | Zhang | G06N 5/025 |
| | | | 706/47 |
| 2009/0249294 A1 | 10/2009 | Ocke et al. | |
| 2011/0238610 A1 | 9/2011 | Lee et al. | |
| 2011/0246407 A1 | 10/2011 | Lee et al. | |
| 2013/0103619 A1* | 4/2013 | Ardoint | G06F 15/18 |
| | | | 706/12 |

OTHER PUBLICATIONS

Bringing OWL Ontologies to the Business Rules Users—2012 Adil El Ghali1,2, Amina Chniti2,3, and Hugues Citeau2.*
Bringing OWL Ontologies to the Business Rules Users—2012 Adil El Ghalil,2, Amina Chniti2,3, and Hugues Citeau2.*
A Rule-Based Object-Oriented OWL Reasoner—2006 Georgios Meditskos and Nick Bassiliades, Member, IEEE.*
Automatic update of vague ontological concepts Paolo Pareti The University of Edinburgh Master of Science Artificial Intelligence School of Informatics University of Edinburgh Aug. 2011.*
ONTORULE—Jan. 21, 2011 D2.3 Consistency Maintenance, Intermediate Report Jorg Puhrer (TUWIEN).*
Integrating Ontologies and Relational Data—2007 Sören Auer University of Pennsylvania, auer@seas.upenn.edu Zachary G. Ives University of Pennsylvania, zives@cis.upenn.edu.*
ONTORULE Where Ontologies MeetBusiness Rules—2009 The Demonstrator Engines Hugues Citeau, Senior Developer IBM—French CAS.*
T. Ozacar et al., "Optimizing a Rete-Based Inference Engine Using a Hybrid Heuristic and Pyramid Based Indexes on Ontological Data", Journal of Computers, vol. 2, No. 4, Jun. 2007, pp. 41-48.
M. Sensoy et al., "Combining Semantic Web and Logic Programming for Agent Reasoning," Springer-Verlag, Proceedings of the 10th International Conference on Advanced Agent Technology, Berlin Heidelberg, 2012, pp. 428-441.
C. Forgy, "Rete: A Fast Algorithm for the Many Pattern/Many Object Pattern Match Problem", Artificial Intelligence 19, 1982, pp. 17-37.
D. Calvanese et al., "OWL 2 Web Ontology Language Profiles (Second Edition): 4.3 Reasoning in OWL 2 RL and RDF Graphs Using Rules", World Wide Web Consortium (W3C), Dec. 11, 2012, pp. 1-11.
J. Bao et al., "OWL 2 Web Ontology Language Document Overview (Second Edition)", World Wide Web Consortium (W3C), Dec. 11, 2012, pp. 1-8.

\* cited by examiner

Verification Example 1/3

No issue / limit detected

Verification Example 2/3

No issue / limit detected

Verification Example 3/3

One issue / limit detected

| Compilation Unit Declarations A | | |
|---|---|---|
| Logical Rule Declaration | Declares a logical rule that gives bodies to predicates, class and properties included. A duplicate is simply adding bodies. The head is restricted to a positive atom with variables. The bodies are formulas. | logical rule {<br>when {<br>directFlight(?x,?z);<br>\| Flight(?x,?y);<br>Flight(?y,?z);<br>}<br>then {<br>Flight(?x,?z); }<br>} |
| Logical Struct Declaration | Declares a logical type.<br>This is syntactic sugar over logical rules. Each type constructor is a logical rule. An additional logical rule finally connects the type to its constructors. | logical struct List(?l) { Nil(?l)<br>when {<br>=(?l,rdf:nil);<br>}<br>\| Cons(?l,?f,?r)<br>when {<br>T(?l,rdf:first,?f);<br>T(?l,rdf:rest,?r);<br>}<br>} |

FIGURE 6A

| Compilation Unit Declarations B | | |
|---|---|---|
| Package Declaration | Opens a new current package and associates a convenient short prefix to a complex URI. | package family = \`http:// www.ontorule-project.eu/family#\`; |
| Import Declaration | Opens an existing package. | import family; |
| Class Declaration | Declares a class. A class is a predicate whose arity is 1. A duplicate declaration is ignored. | class Person; |
| Property Declaration | Declares a property. A property is a predicate whose arity is 2. Property axioms can be specified. A duplicate declaration may add property axioms. | property name { functional; domain Person; range string!(minLength 1); }; |

FIGURE 6B

| Compilation Unit Declarations C | |
|---|---|
| Production Rule Declaration: Declares a production rule. The rule with the highest priority is the first one declared in the file. The condition is a formula. | production rule prp_inv1 { when { T(?p1,owl:inverseOf, ?p2); T(?x,?p1,?y); } then { insert T(?y,?p2,?x); } } |
| Function Declaration: Declares a user defined function. Two functions with the same identifier but different arities are different. Since object classification is fully dynamic, object parameters and return values may only be optionally typed as thing. | function double add1(integer ?v) { return ?v + 1; } |

FIGURE 6C

| Built-in functions | | |
|---|---|---|
| print | Prints a value on the PrintWriter that was passed to the Engine. The value is a Term. Works with any sort of value. | print("hello") |
| println | Prints a value on the PrintWriter that was passed to the Engine and go to the next line. The value is a Term. Works with any sort of value. Also works without any value simply to go to the next line. | println("hello")<br>println() |

FIGURE 6D

| Axioms A | | |
|---|---|---|
| Equivalence Axiom | Declares that two expressions are equivalent. Works for any predicates with same arity. | class Cat == Chat; class GoodBoy == Good && Boy; |
| Sub Axiom | Declares that a first expression is a sub expression of a second expression.. Works for any predicates with same arity. | class Car << Vehicle; |
| Super Axiom | Declares that a first expression is a super expression of a second expression. Works for any predicates with same arity. | class Vehicle >> Car; |
| Disjoint Axiom | Declares that a first expression is disjoint with a second expression.. Works for any predicates with same arity. | class Man <> Woman; |

FIGURE 6E

| Axioms B | | |
|---|---|---|
| Inverse Axiom | Declares that a first expression is the inverse of a second expression.. Works for any predicates with same arity. | class Good inverse Bad; property parent inverse child; |
| Simple Property Axioms | Declares property axioms inside a property declaration. | functional; inverse functional; reflexive; irreflexive; symmetric; asymmetric; transitive; |
| Property Domain | Declares the class of the subject as an expression inside a property declaration. | domain Man \|\| Woman; |
| Object Property Range | Declares the class of the object as an expression inside a property declaration. | range Small && Fat; |
| Data Property Range | Declares the datatype of the object inside a property declaration. | range integer!(>= 10,<= 20); |

FIGURE 6F

| Expressions (Class, Property, Predicate) A | | |
|---|---|---|
| Union Expression | Creates an expression that is the union of two expressions. | class Plane \|\| Boat |
| Intersection Expression | Creates an expression that is the intersection of two expressions. | class Plane && Boat |
| Difference Expression | Creates an expression that is the complement of a first world expression with respect to a second expression. | class Human -- Man |
| Existential Restriction Expression | Creates an expression that denotes the set of the subjects such that there exist some property asssertions. The property is an expression. The cardinality restriction is >= 1 by default. | some(child,>= 4)!Man |
| Universal Restriction Expression | Creates an expression that denotes the set of the subjects such that all the property asssertions hold. The property is an expression. | all(child) !Man |

FIGURE 6G

| Expressions (Class, Property, Predicate) B | |
|---|---|
| HasSelf Expression:<br>Creates an expression that denotes the set of the subjects that are also objects of property assertions. The property is an expression. This is restricted to object properties. | has(friend,self) |
| HasValue Expression:<br>Creates an expression that denotes the set of<br>the subjects of property assertions that involve a particular constant.<br>The property is an expression. | has(friend,maurice) |
| Property Chain Expression:<br>Creates an expression that combines two property expressions | hasBrother.hasParent |
| Enumeration Expression:<br>Creates an expression that denotes a set whose elements are enumerated. | enum{maurice,marcel}<br>enum{1,2,3} |
| Identifier Expression:<br>Creates a named predicate expression. A prefix is optional for open packages. Predicates with same names but different arities are different. | hasBrother<br>mypackage:hasBrother |

FIGURE 6H

| More Expressions (Class, Property, Predicate) C | | |
|---|---|---|
| Property Expression | Creates a named property expression.<br>The property is automatically declared as it is used. | property hasParent |
| Built-in Predicate Expression | Creates a built-in predicate expression. | *Same as Facet restriction operators (=, !=, >=, ...)* |
| Parenthesized Expression | Syntactic mean to group expressions outside of default operator priorities. | (class Man \|\| Woman) |

| Cardinality Restriction | | |
|---|---|---|
| Cardinality Restriction | Specifies a cardinality restriction.<br>The restriction value must be an integer constant. | = 10<br>>= 10<br><= 20 |

FIGURE 6I

| Data Types | |
|---|---|
| Datatype: Creates a datatype expression. | literal boolean integer float double string |
| Restricted Datatype: Specifies a comma separated list for optional facet restrictions for a datatype. | *integer* !(>= 10,<= 20) |
| Numeric Facet Restrictions: The possible facet restrictions for a numeric datatype. The bound must be a constant number. | = 10<br>!= 20<br>> 10<br>>= 10<br>< 10<br><= 20 |
| String Facet Restrictions: The possible facet restrictions for a string datatype. The named built-in facet operators are declared in the lang package. The patterns must follow the Java language specification for regular expressions (see java.util.regex). The additional parameters specified in the facet restriction must be constants. | = "maurice"<br>!=    "maurice"<br>minLength    10<br>maxLength    10<br>length 10<br>pattern "*abc?" |

FIGURE 6J

| Object Types | | |
|---|---|---|
| Thing Object Type | Optionally specifies that a variable must denote an object value and not a data value. Object classification is fully dynamic, a more precise object class expression is not allowed as a type annotation. | thing |

FIGURE 6K

| Formulae A |||
|---|---|---|
| And Formula | Creates a formula that is the conjunction of two formulas. Syntactically, the conjunction is implicit. The variables with the same names are automatically joined with an equality expression. | Flight(?x,?y); Flight(?y,?z); |
| Exists Formula | Creates a cardinality restriction formula for a nested formula. When not mentioned the cardinality restriction is >= 1. | exists >= 3 { Person(?x); age(?x,?a); >=(?a,20); } |
| Not Formula | Syntactic sugar for an exists formula whose cardinality restriction is <= 0. | not { Person(?x); age(?x,?a); >=(?a,20); } |

FIGURE 6L

| Formulae B | |
|---|---|
| For Formula: Creates a loop formula. Many iterator clauses can be specified. The iterator variables are new variables. An iterator clause specifies the initial value and the next value. Initial and next values are terms. Both the iterator variables and the variable of the nested body are in scope outside of the for formula. | for (?i = ?r1,?ri; ?u = ?u2,?ui) { Cons(?i,?pi,?ri) ; T(?u,?pi,?ui); } |
| True Formula: Creates a true formula. | true; |
| False Formula: Creates a false formula. | false; |
| Expression Formula: Creates a positive atomic formula. The predicate is an expression. The arguments of the predicate are terms. | Person(?p); (Small && Fat)(?p); some(child,>= 4)(?p); age(?p,?a); integer!(>= 10)(?a); >=(?a,10); |

FIGURE 6M

| Terms A | |
|---|---|
| Additive Term: Creates a term that denotes the addition or the subtraction of two terms.. | ?a + 10<br>?a - 10 |
| Multiplicative Term: Creates a term that denotes the multiplication or the division of two terms.. | ?a * 2<br>?a / 10 |
| Unary Term: Creates a term that denotes the application of a unary operator to a term. | -10<br>-?a<br>+?a |
| Call Term: Creates a term that denotes the application of a function to arguments.<br>The arguments are terms. | add1(12) |
| Variable Term: Creates a variable term. | ?a |
| Individual Term:Creates a term that denotes an individual.<br>A prefix can be used if necessary.<br>The object type is thing. | family:maurice<br>marcel |
| True Term: Creates a true constant term. The datatype is boolean. | true |

FIGURE 6N

| Terms B | |
|---|---|
| False Term<br>Creates a false constant term.<br>The datatype is boolean. | false |
| Integer Term: Creates an integer constant term.<br>The datatype is integer. | 12 |
| Floating point Term: Creates a float constant term. The datatype is double. | 12.24 |
| String Term: Creates a string constant term. The datatype is string. | "maurice" |
| Typed constant Term: Creates a typed constant term. | 12@float |
| New Individual Term: Creates a new individual. The new individual still has to be typed and connected to the graph thanks to assertions. | new thing() |
| Parenthesized Term: Syntactic mean to group terms outside of default operator priorities. | (?a – 1) |

FIGURE 6O

| Actions A | | |
|---|---|---|
| Block Action | Creates an action that introduces a new local variable scope and groups sequential actions. | {<br>let ?v = 10;<br>insert age(?x,?v);<br>} |
| Insert Action | Creates an action that adds an assertion. The assertion must be a positive atomic formula. The verifier will notify of any inconsistency this assertion may introduce. | insert Person(?p);<br>insert age(maurice,20); |
| Remove Action | Creates an action that removes an assertion. The assertion must be a positive atomic formula. The verifier will notify of any inconsistency this assertion may introduce. | remove Nice(?p);<br>remove status(maurice,gold); |
| Term Action | Creates an action that denotes the evaluation of a term where the result is discarded.. | println(?x); |

FIGURE 6P

| Actions B | |
|---|---|
| Let Action: Creates an action that declares a local variable. A duplicate variable is an error. The type specification is optional. But when specified the type must be compatible with the type of the initial value. Since object classification is fully dynamic, object variables may only be typed with an optional thing. | let ?v = "maurice"; let integer ?x = 10; let thing ?m = maurice; |
| Return Action : Creates an action that returns a value from a function. The return value is a term. The type of the return value must be compatible with the return type of the function. | return 12; |
| Assignment Action: Creates an action that assigns a new value to an action term. So far the only mutable terms are the variable terms. | ?v = "marcel"; ?x = ?x + 10; |

FIGURE 6Q

| Advanced Constraints | |
|---|---|
| Transition Rule Declaration Declares a production rule that detects transitions. Transition rules are convenient to implement transition graphs (aka ruleflows, workflows) with rules. The condition part of the transition rule is made of two formulas, the past formula after the when and the current formula after the wait. The past formula is matching a past state. The current formula is matching the current state. The past formula may well have become unsatisfied while waiting for a current state that satisfy the current formula. The 'some' keyword is pointing out the fact that the wait will stop as soon as at least one satisfying current state is matched and not 'all' the possible current states. This way, past states as automatically removed without having to rely on a time out mechanism. | production rule BalanceUpdated { <br> when { <br> balance(?account ,?b1); <br> } <br> wait some { <br> balance(?account ,?b2); <br> !=(?b1,?b2); <br> } <br> then { <br> print("The balance of "); <br> print(?account); <br> print(" has changed from "); <br> print(?b1); <br> print(" to "); <br> println(?b2); } <br> } |

FIGURE 6R

PRODUCTION RULE ENGINE

This application is based on and claims the benefit of priority from United Kingdom (GB) Patent Application 1300257.1, filed on Jan. 8, 2013, and herein incorporated by reference in its entirety.

EC NOTIFICATION

The work leading to this invention has received funding from the European Community's Seventh Framework Program (FP7/2007/2013) under Grant Agreement No. 231875.

BACKGROUND

This invention relates to a method and apparatus for a production rule engine. In particular this relates to a method and apparatus for extending a production rule engine with ontological reasoning.

A production rule is a rule with a condition part and an action part. The condition part is there to constantly match the instances grouped in working memory. The action part is there to react on the matched instances and to update the available instances. Production rules are written according to the descriptions of the instances they are going to process. They are expected to change the instances but not the descriptions.

Ontologies are providing both descriptions and instances. Ontology Web Language2 (OWL2) is a standard ontology for a new candidate state of practice.

In an object model, descriptions are classes with typed attributes organized as class hierarchies. Classes are there to classify the instances. An instance is an object with an internal structure that depends on its class. The production rules in this case are directly matching objects in the condition part. And they are directly updating objects in the action part.

In a standard OWL2 ontology, descriptions are logical descriptions. A class is a predicate of arity one. A class assertion is a classification fact about an individual. Individuals may belong to many classes. In OWL2 properties are not part of the class definitions. Here, a property is a predicate of arity two. A property assertion is a relational fact involving a subject, an individual, and an object, a constant. By default many subjects can be connected to many objects. Thus properties are really relations by default which is not the case in an object model. A constant is either an individual or either a data value. An individual is not comparable to an object of an object model. It does not have dedicated internal slots to store the values of its attributes. Besides being a "thing", an individual does not have a particular instantiation type as it is the case for the objects in an object model. An individual is just becoming a member of some classes according to the classification assertions. When trying to map objects to individuals, the internal structure of the objects needs to be exposed as facts using only properties and classes involving individuals and data values. An object model is only a very particular case of an OWL2 ontology. The production rules coupled to an OWL2 ontology are matching facts, knowledge about constants, in the condition part. And they are updating facts in the action part.

As already mentioned, standard OWL2 ontological descriptions are more sophisticated than the class hierarchies of an object model. Operators are available to recursively combine class and property expressions. But the most important OWL2 constructs are the axioms that tell how to reason on the class and the property expressions.

SUMMARY

In one embodiment of the present invention, a production rules engine comprises: a class loader for loading a production rule ontology into a rule engine; a class loader for loading production rules into the rule engine, wherein a production rule comprises a rule and an action defined in the production rule ontology; instance creation logic for creating instances of production rules; a reasoner for executing the production rules and for locating an instance of a production rule having an inconsistency between an action to change the ontology and the existing ontology and for executing the production rules after inconsistencies have been fixed; a constraint engine for locating a solution to an inconsistent ontology; and a fixer for updating the inconsistent ontology with the located solution.

In one embodiment of the present invention, a method and/or computer program product operates production rule engine. The method comprises: loading a production rule ontology into a production rule engine; loading production rules into the production rule engine, wherein a production rule comprises a rule and an action defined using the production rule ontology; executing, by one or more processors, the production rules; locating a logical inconsistency between ontology changed by a respective action and the existing ontology; locating a logical solution to the inconsistent ontology; and updating the ontology with the located logical solution.

BRIEF DESCRIPTION OF THE SEVERAL VIEWS OF THE DRAWINGS

Preferred embodiments of the present invention will now be described, by way of example only, with reference to the following drawings in which:

FIG. 6A to FIG. 6R are tables detailing the language of the production rule terminology.

DETAILED DESCRIPTION

Figure 1:
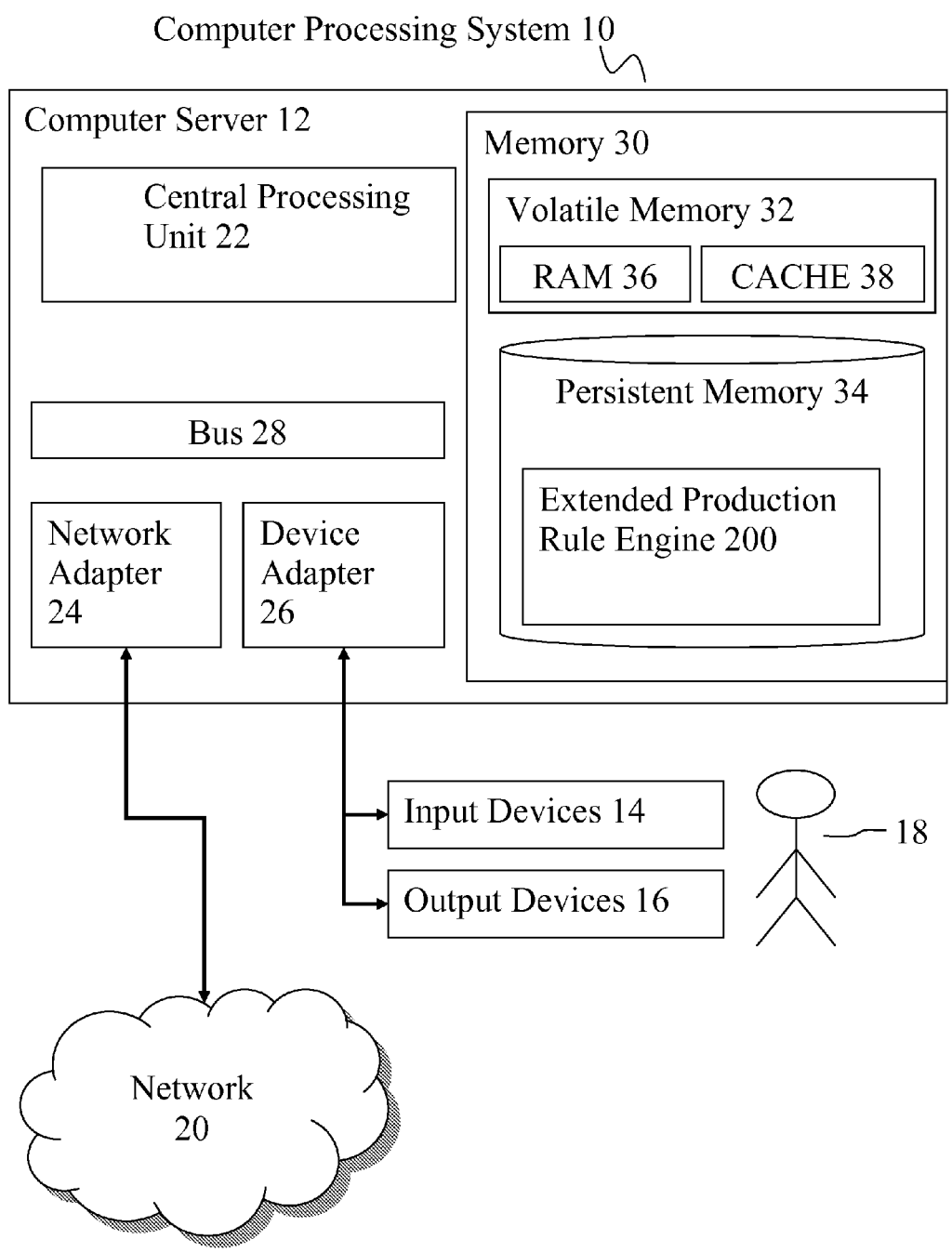
FIG. 1 is a deployment diagram of the preferred embodiment.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprise extending production rule engine 200. Further program modules that support the preferred embodiment but are not shown including firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 2:
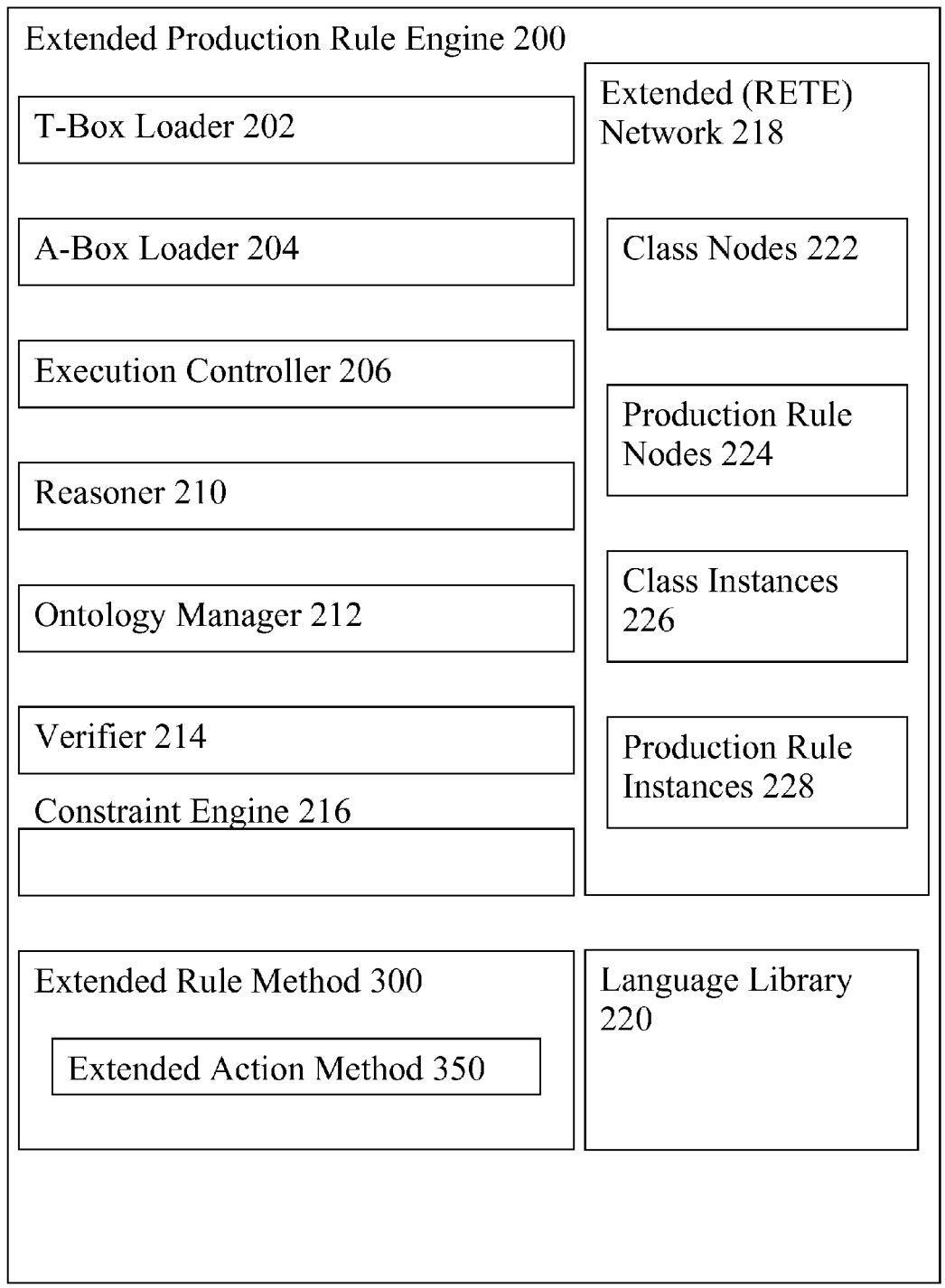
FIG. 2 is a component diagram of the present embodiment.

Referring to FIG. 2, extended production rule engine 200 comprises the following components: T-box loader 202; A-box loader 204; execution controller 206; reasoner 210; ontology manager 212; verifier 214; constraint engine 216; extended rules network 218; language library 220; extended rule method 300; and extended action method 350.

T-box loader 202 is for loading ontology classes into extended rules network 218.

A-box loader 204 is for loading production rule assertions into extended rules network 218.

Execution controller 206 is for identifying the production rule instance with the highest priority. Each production rule instance has a priority which helps in selecting the action that should be executed first. The execution controller is for controlling execution of the action of the highest priority production rule instance. A preliminary step for the engine is to mark the production rule instance as executed so as to avoid executing a production rule twice for a particular valuation. This is why the production rule engine cycle ultimately ends when all the possible production rule instances have been executed.

Reasoner 210 is for answering queries on the ontology (For instance: is marie a Person?, give me the set of all the products marie has bought). The valuation of the conditions of the production rules can be partly implemented with those queries. The production rule engine generates queries from the conditions. Reasoner 210 is also for answering the queries and providing the valuations for the conditions. During the valuation of the conditions the population is only observed.

Since OWL2 ontologies are sophisticated, reasoner 210 is necessary to extract information from the ontology. Reasoner 210 is a deductive query engine which will use the axioms of the ontology to build its internal reasoning steps. Reasoner 210 can perform the following functions: 1) to tell whether a class expression is a subclass of another class expression, 2) to tell whether an individual is an instance of a class expression, 3) to retreive the constants that are connected to an individual thanks to a property. The production rule engine will need function 1) at compile time to type-check the rules. The production rule engine will need function 2) and 3) at runtime to match the current state of the ontology with the condition parts of the rules. The reasoner implements a tableau method to find a model for a logical formula. If a model can be found, the formula is satisfiable. If not, it is not satisfiable. A tableau in particular be represented as a graph of representative Individuals labeled with classes on the nodes and properties on the edges. There is a contradiction as soon as a class and its complement are both labels of the same node.

OWL2 reasoners are not taking care of ontology changes. Changing facts may introduce logical inconsistencies in the ontology. An OWL2 reasoner will be able to check if an ontology is still consistent as a whole after a local change. But a consistency check is a costly operation. It is however mandatory because an inconsistent ontology cannot be used anymore for reasoning. Thus introducing inconsistencies should be avoided by all means. This is an issue for production rules. Production rules are used instead of logical rules precisely for this case because they provide means to update the ontology in the action part. There is no reason to use production rules instead of logical rules if the ontology is simply observed.

The preferred embodiment tightly couples production rule engine and a reasoner so that in the preferred embodiment the reasoner is a component of the extended production rule engine.

A weakly coupled approach is discussed briefly for comparison. The weakly coupled approach uses two distinct engines. The production rule engine is on one side and the OWL2 reasoner is on the other side. The production rule engine is the master. It delegates ontology related tasks to the OWL2 reasoner. Everything is fine while the ontology is not updated. When it is updated in the action of a production rule, facts are added or removed from the ontology. There is no guarantee that adding or removing those facts will not introduce an inconsistency. The production rule engine can try to check on its side what will be the impact of adding or removing a fact. But when trying to do so, it has to reason exactly like the OWL2 reasoner so as not to miss any derived fact. A derived fact is a fact derived from already known facts, previously derived facts included, thanks to an axiom of the ontology. This recursive sentence shows in particular that many facts can be derived from a single asserted one. Thus, since taking into account OWL2 reasoning is mandatory for the production rule engine to check the impact of an ontology update in the action part, the best is to add OWL2 reasoning capability deep into the production rule engine itself.

The tightly coupled approach is made of a single engine able to process production rules while performing OWL2 reasoning both for matching direct and derived facts in the condition part and for building all the derived facts from an assertion in the action part. Here there is a design choice for the technology to be used. Either a production rule engine technology is extended to support OWL2 reasoning. Or either a logic engine technology is extended to support production rules evaluation. The logic engine technology does not support fact changes very well.

It is rather there to answer deductive queries on facts that do not change while the query is being processed. The logical engine technology will hardly be able to emulate production rules that are precisely there to deal with changes as they are running. The issue is that a logic engine and production rule engine do not accept the same level of responsibility in their engine cycles. The production rule engine is including the update in its engine cycle which is not the case of a logic engine. A logic engine can be responsible for the management of the condition parts of the production rules, but not for the management of the full cycle which includes the actions and the update of the knowledge matched in the condition parts. However, production rule technology dedicated to update from the start can be extended to support as much as OWL2 reasoning as possible even if some limitations will also show up. More precisely a RETE algorithm [Charles Forgy, "Rete: A Fast Algorithm for the Many Pattern/Many Object Pattern Match Problem", Artificial Intelligence, 19, pp. 17-37, 1982] can be extended to support a significant subset of the OWL2 reasoning. The origin of the name RETE is thought to come from the Latin name for a net or network.

Ontology manager 212 is for updating the ontology including the T-Box and the A-Box.

Verifier 214 is for detecting any assertion that might introduce an inconsistency in the ontology. This is described in more detail with respect to FIGS. 5A, 5B and 5C. Verifier 214 is also for detecting and avoiding certain limitations in extended network in particular the Open World Assumption (OWA) limitation and the Non Unique Name Assumption (Non-UNA) limitation. These limitations are described in more detail below in the example operation section.

Constraint engine 216 is for locating solutions to the inconsistency in extended network 218.

Extended network 218 is for supporting reasoning for both ontology and production rules and is based on a network. Extended network 218 comprises data structure for storing a network of: class nodes 222; production rule nodes 224; class instance nodes 226; and production rule instance nodes 228.

A class node 222 is a definition from the ontology of the terminology.

A production rule node 224 is a definition from the production rule set including conditions and actions from the ontology.

A class instance node 226 is a particular instance (individual) of a class node.

A production rule instance node 228 is a particular instance (individual) of a production rule node.

Extended network 218 is a network made of nodes. A node is a data structure formed in memory. Extended network 218 is the result of the compilation of the condition parts of the production rules. The first level of nodes is made of class nodes. The class nodes are next connected to classical relational algebra nodes: filters, joins, product, and fork. The network is finally closed with output production rule nodes. Extended network 218 is initially only a static data structure which is the result of the compilation of the production rules driven by the similarities that exist in their condition parts. For runtime purpose, the production rule engine associates local memories to the nodes and manages the propagation of the facts asserted from the top-level through the network until some rule instances can be created. A fact is added to a local memory whenever it satisfies the condition of the node and is propagated for add to the next nodes of the network. It is removed from a local memory if it does not satisfy the condition and is propagated for removal to the next nodes of the network.

Extended network 218 is based on static sharing. Two pieces of rule conditions that are statically equivalent are compiled to a single node. More sophisticated sharing than equivalence may even be taken into account.

Extended network 218 is incremental and stateful. Facts are added and removed one by one. A fact is only combined with the other relevant facts. Added facts or combined facts are stored in local memories so as to be immediately available for the forthcoming updates. Local memories are sets. Two equivalent facts are merged as a single fact so as to avoid redundancies. Reasoning using extended network 218 that has already been performed will not be done twice here. The local memories are only updated when facts are added or removed. The answer to deductive queries is immediate because it simply consists in extracting the content of a local memory of the node that corresponds to the query.

Language library 220 comprises a library set of generic nodes used or called as part of class nodes or production nodes. This is described below with respect to FIG. 6A to 6I.

Extended rule method 300 is described in more detail below with respect to FIG. 3A.

Extended action method 350 is described in more detail below with respect to FIG. 3B.

Figure 3A:
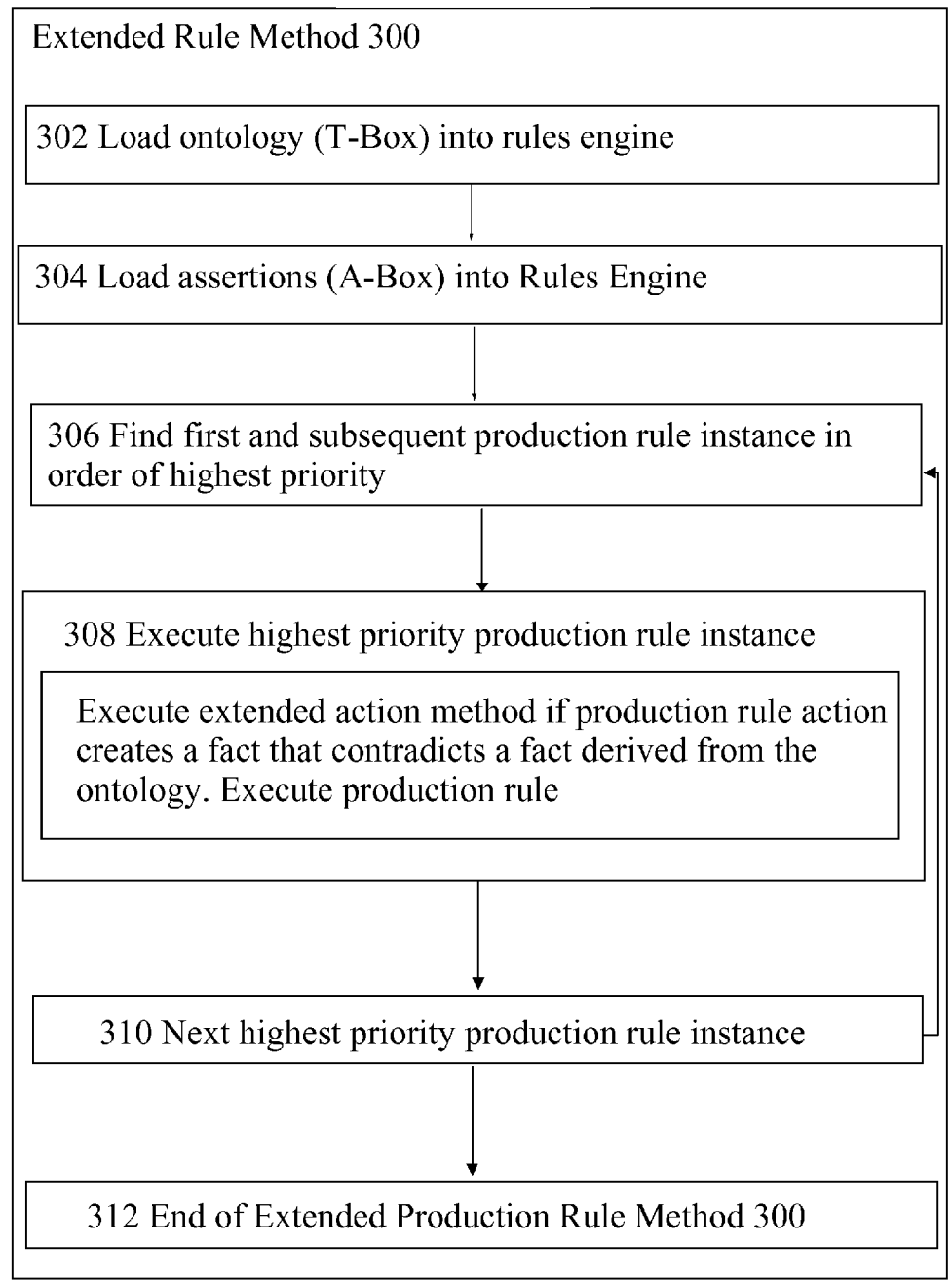
FIG. 3A to FIG. 3B are flow diagrams of processes of the preferred embodiment.

Referring to FIG. 3A, method 300 comprises logical process steps 302 to 312.

Step 302 is for loading the ontology (T-Box) into the extended production rules engine and in particular into the extended network 218. The ontology comprises class and property definitions and the production rules.

Step 304 is for loading the assertions (A-Box) into the extended production rules engine and in particular into the extended network 218. In more detail, the step is for adding individuals to A-Box class instances 226; for adding individual to T-Box class instances 226; and for adding individual to production rule instances 228.

Step 306 is for locating first and subsequent production rule instances in order of highest priority.

Step 308 is for executing the highest priority located production rule instance. In the preferred embodiment extended action method 350 is invoked if production rule action creates a fact that contradicts a fact derived from the ontology. After extended action method 350 has finished executing or if there is no contradiction then the production rule is executed.

Step 310 is for looping back to step 306 for the next highest priority production rule instance.

Step 312 is the end of extended production rule method 300

Figure 3B:
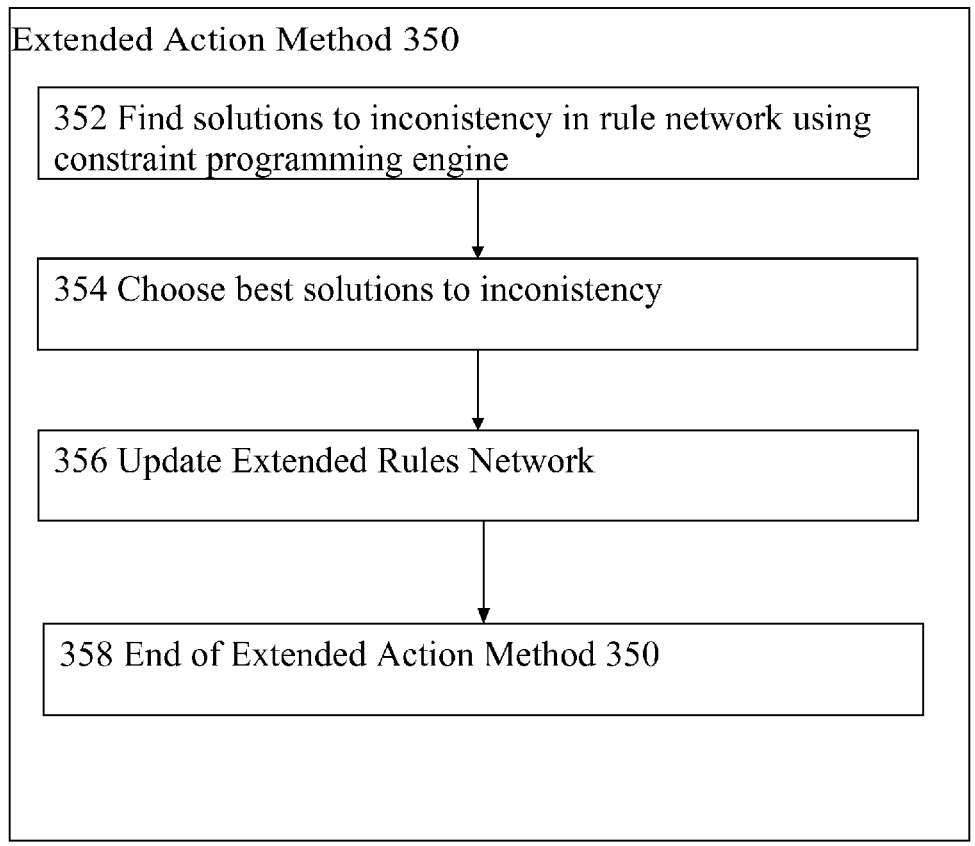

Referring to FIG. 3B, method 352 comprises logical process steps 352 to 358.

Step 352 is for locating solutions to the inconsistency in rule network using constraint engine 216

Step 354 is for choosing the best solutions to inconsistency.

Step 356 is for updating the extended rules network using ontology manager 212.

Step 358 is the end of extended action method 350.

Figure 4A:
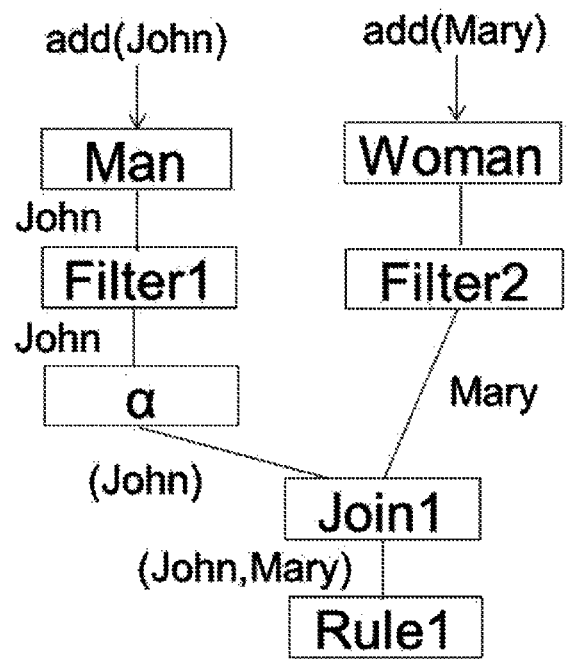
FIGS. 4A and 4B are node diagrams of a logical network.
Figure 4B:
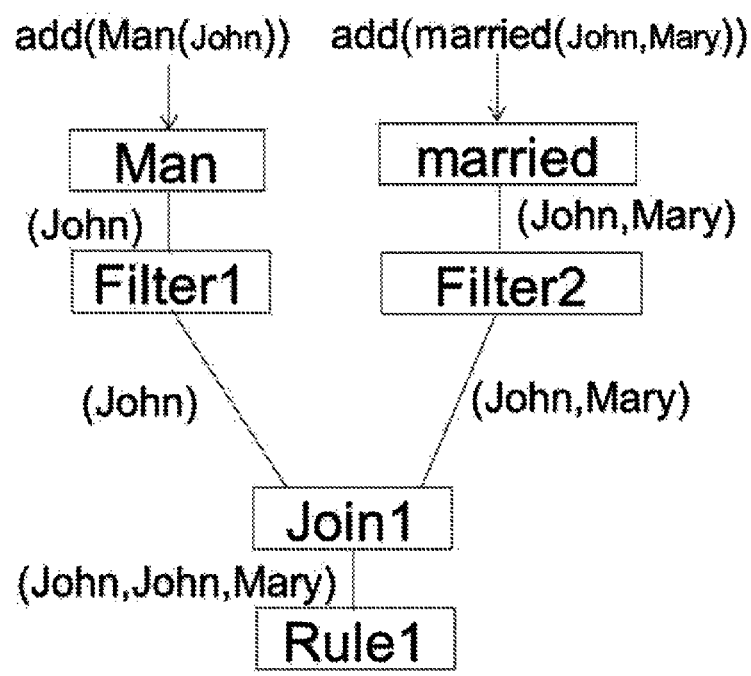

Referring to FIGS. 4A and 4B, logical network data structures according the preferred embodiment are described.

FIG. 4A shows a logical network data structure representing a rule for joining a single instance of a man class and instances of woman class. The root node is labeled Rule1 connected to a Join1 node. Join1 node is connected to "a" node and Filter2 node. "a" node is connected to Filter1 node. Filter1 node is connected to Man node. Filter2 is connected to Woman node. The nodes are data structures in memory that represent the structure of rule. When a rule is instantiated the nodes get populated. The example in FIG. 4A is for adding a John object (an instance of a man class) and adding a Mary object (an instance of a woman class) to the rule that has been defined. As the rule is instantiated, the nodes are traversed and appropriate object associations added. Therefore Man node, Filter1 node and "a" node are linked to the John object. The Woman node and Filter2 node are linked to the Mary object. The Join1 node is linked to both the John and Mary object.

FIG. 4B shows a logical network data structure representing a rule for joining a single instance of a man class to a John and Mary instance of the function married( ). The root node is labeled Rule1 connected to a Join1 node. Join1 node is connected to Filter1 node and Filter2 node. Filter1 node is connected to Man node. Filter2 is connected to married node. As the rule is populated, the nodes are traversed and appropriate object associations added. The Man node and Filter1 node are linked to the John object. The married node and Filter2 node are linked to the John and Mary objects. The Join1 node is linked to two John objects and a Mary object.

Figure 5A:
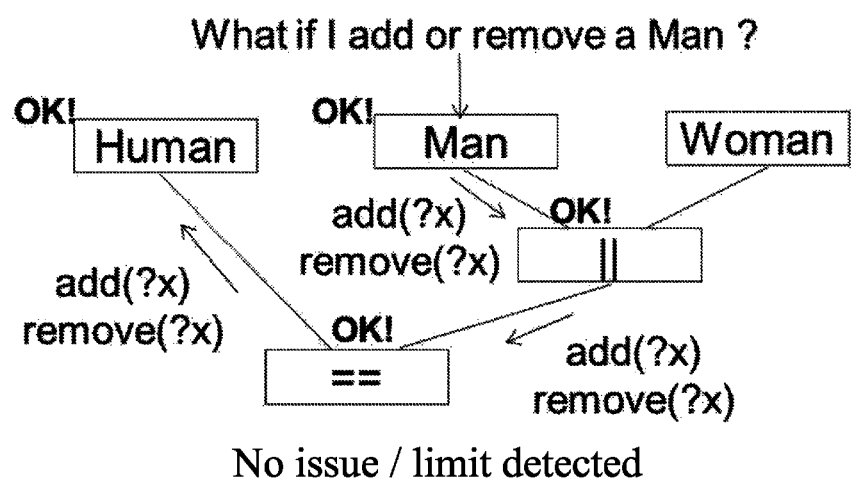
FIGS. 5A, 5B and 5C are verification examples using logical node diagrams.
Figure 5B:
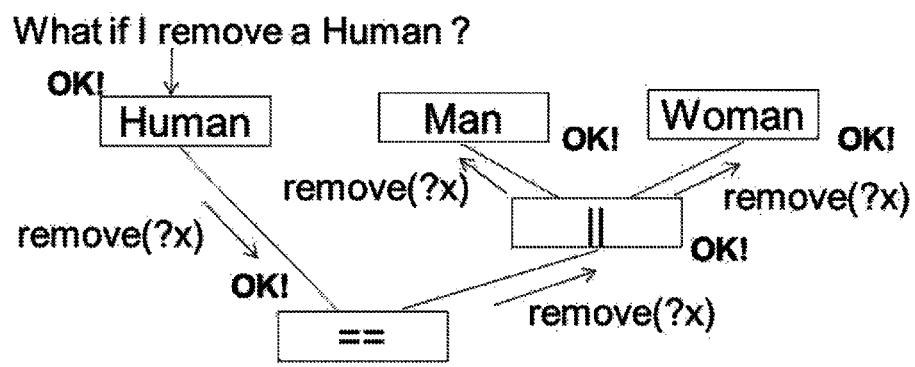
Figure 5C:
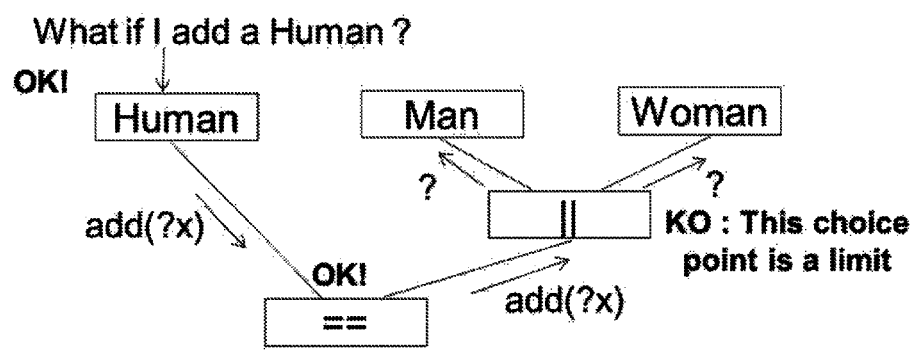

FIGS. 5A, 5B and 5C are verification examples using logical node diagrams. Verifier 214 uses constraint propagation in the extended RETE network for fine grain verification. The kind of propagation (for example, add or remove) is taken into account. The propagation path (forward or backward) is taken into account. Constraints on the elements of the tuple are taken into account.

The example nodes of FIGS. 5A, 5B and 5C represent the rule that a Human class (the node labeled Human) includes (the node labeled ==) Man class (the node labeled Man) or (the node labeled ||) Woman class (the node labeled Woman).

In FIG. 5A the rule is tested by adding or removing a man instance to the Man node. The rules of the particular nodes allow the instance to propagate from the man node; to the || node; to the == node; and to the Human node. At each node a man instance may be added or removed without issue or limitation and the change is verified.

In FIG. 5B, the rule is tested by removing a human instance from the Human node. The rules of the particular nodes allow the instance to propagate from the Human node; to the == node; to the || node; and to each of the Man node or Woman node. At each node a human instance may be removed without issue or limitation and the change is verified.

In FIG. 5C, the rule is tested by adding a human instance from the Human node. The rules of the particular nodes allow the instance to propagate from the Human node; to the == node; and to the || node. At the Human node and == node a human instance may be added without issue or limitation. However, the || node is a choice point and since there is only one human instance the choice cannot be made. This node is a limit and the change has an issue and cannot be verified.

Example Operation.

Production rules are grouped in a ruleset (a set of rules). The production rules are expected to update a knowledge base. The conditions of the production rules will be valuated by the population of the knowledge base. The actions will perform the update of the population of the knowledge base to reflect the changes that the production rules are automating.

Each condition is specifying the population of interest for its production rule (for instance, I am interested in any person who has bought a book). The conditions are formally expressed using the vocabulary introduced for the description of the population in the knowledge base (for instance, Person(?p) and hasBought(?p,?b) and Book(?b)). In OWL2 the population is described in the terminology box (T-Box) with named classes (Person, Book) and named properties (hasBought) as the basic building blocks. The named classes and the named properties can be combined respectively thanks to class and property expressions that mainly introduce logical connectives, restrictions and navigation facilities (for instance, Book or CD is a class expression, all (hasBought)!Book is a class that restricts the population to who is the subject of the property hasBought and has only bought Book, -hasBought is a property expression that denote the inverse of the hasBought property that could typically have been named isBoughtBy). In OWL2 the population is made of class and property assertions that only involve constants: named individuals (objects) or data values (For instance: Person(marie) states that marie is a member of the class Person, hasBought(marie,lordOfTheRing) states that marie and lordOfTheRing are related thanks to the object property hasBought, hasAge(marie,12) states that marie and 12 are related thanks to the data property hasAge). In OWL2 the population is called the assertion box (A-Box). A condition is valuated by the population. The variables introduced in the conditions are acting as placeholders to receive the elements of the population that satisfy the condition (For instance if Person(marie) and hasBought (marie,lordOfTheRing) and Book(lordOfTheRing) is the population, the condition Person(?p) and hasBought(?p,?b) and Book(?b)) is valuated with ?p=marie and ?b=lordOfTheRing). A valuated condition generates a Production Rule Instance. All the combinations of the population that satisfy the conditions of all the Production Rules are considered (the top variables of a Production Rule condition are implicitly universally quantified).

A production rule action is a piece of script (a list of atomic actions) where a production rule may interact with the application it is embedded in. The variables of the condition are in scope in the action (For instance if the condition is valuated with ?p=marie, each time an action is mentioning ?p, marie will be substituted). The most important atomic actions are the ones that are able to update the population of the knowledge base (they are not part of the traditional scripting actions as they are really dedicated to this task). There is an action to add to the population and an action to remove from the population (For instance: insert hasBought(marie,bridgetJones); tells to add the fact that marie has bought bridgetJones to the population of the knowledge base and remove hasBought(marie,lordOfTheRing); tells to remove the fact that marie has bough lordOfTheRing from the population). When interpreting an update (add or remove) action, the production rule engine first reflects the change in the population of the knowledge base. Next the engine evaluates again all the conditions that can be valuated with the new state of the population (because the population has been updated).

The RETE algorithm is a very useful algorithm for a production rule engine. It proposes a mean to optimize the compilation of the conditions of the production rules to a data structure called the RETE network. The production rule engine next provides a stateful and incremental interpretation of this RETE network. Stateful means that the engine keeps tracks of all the intermediate valuations of the conditions (thanks to local memories associated to each stateful node of the network). Incremental means that the engine only considers what has changed to update the valuation of the conditions following an update action.

Since with a RETE the production rules are compiled and depend on the T-Box, it is assumed that the T-Box is not modified during the processing of the A-Box. Hence the production rules may only add or remove population assertions to/from the A-Box. It is of course assumed that the ontology is initially consistent (does not contain inconsistencies) when initially passed to the rule engine.

From the authoring standpoint, combining production rules and an OWL2 ontology means that the production rules will be written according to the terminology (T-Box) of the ontology. The main construct of an OWL2 T-Box are the OWL2 axioms. They are written on class and property expressions. Those axioms are systematically used for OWL2 reasoning when the OWL2 population (A-Box) is queried.

Here are some examples of OWL2 Axioms:

```
class Person;
class Man << Person;    // Man is a subclass of Person
class Woman << Person;  // Woman is a subclass of Person
class Man <> Woman;     // Man is disjoint from Person
class GoodCustomer;
class Product;
class GiftCandidate;
property hasBought {
  domain Person; // The domain is the class Person
  range Product; // The range is the class Product
};
  property hasBought == hasPurshased; // equivalent properties
```

From the execution standpoint, combining production rules and an OWL2 ontology means that the conditions of the production rules are valuated with the content of the A-Box of the ontology and that the actions of the production rules are modifying the A-Box of the ontology.

Here is a sample A-Box:

```
Woman(marie);
GoodCustomer(marie);
hasPurshased(marie,beautyShower);
```

Here are two sample production rules:

```
production rule GiveGift {
  when {
    (Person && GoodCustomer)(?w);
    hasBought(?w,?p);
  }
  then {
    insert GiftCandidate(?w);
  }
}
production rule PrintProduct {
  when {
    Product(?p);
  }
```

```
        then {
            println(?p + " is a Product");
        }
    }
```

At runtime, the GiveGift production rule is valuated with the content of the sample A-Box with ?w=marie and ?p=beautyShower. When its action is executed, the assertion GiftCandidate(marie) is added to the A-Box. The ListProduct production rule is also valuated with ?p=beautyShower but this time its action has no effect on the content of the A-Box. But since there is no direct correspondence between the content of the A-Box and the concepts the production rules are manipulating, some OWL2 reasoning has also taken place during the valuation of the conditions with the content of the A-Box:

Person(marie) has been inferred from Woman(marie) using the OWL2 subclass axiom: class Woman << Person.
hasBought(marie,beautyShower) has been inferred from
hasPurshased(marie,beautyShower) using the OWL2 property equivalence axiom : property hasBought == hasPurshased.
Product(beautyShower) has been inferred from hasBought(marie,beautyShower) using
the OWL2 property range axiom : property hasBought { range Product; }.

When OWL2 reasoning is properly taken into account, the detailed execution steps of a production rule engine are the following (assuming the rule priorities are based on lexical ordering in the input text: the highest priority rule is the first written rule):

```
Step 1.0 : Loading of the A-Box in the local memories of the RETE:
    [A-Box assertion #1]: Woman(marie)
    (marie) is added to the instances of Woman
    (marie) is added to the instances of Person using the axiom: class Woman <<
    Person
    [A-Box assertion #2]: GoodCustomer(marie)
    (marie) is added to the instances of GoodCustomer
    [A-Box assertion #3]: hasPurshased(marie,beautyShower)
    (marie,beautyShower) is added to the instances of hasPurshased
    (marie,beautyShower) is added to the instances of hasBought using the axiom:
    property hasBought == hasPurshased,
    (?w = marie,?p = beautyShower) is added to the instances of the production rule
    GiveGift
    (beautyShower) is added to the instances of Product using the axiom: property
    hasBought { range Product; }
    (?p = beautyShower) is added to the instances of the production rule
    PrintProduct
Step 1.1.1 : Find the next highest priority rule instance
    GiveGift(?w = marie,?p = beautyShower) [next highest]
    PrintProduct(?p = beautyShower)
Step 1.1.2 : Execute the action of GiveGift(?w = marie,?p = beautyShower)
    insert GiftCandidate(marie)
    (marie) is added to the instances of GiftCandidate
Step 1.2.1 : Find the next highest priority rule instance
    GiveGift(?w = marie,?p = beautyShower) [marked as already executed]
    PrintProduct(?p = beautyShower) [next highest]
Step 1.2.2 : Execute the action of PrintProduct(?p = beautyShower)
    println(beautyShower + " is a Product")
Step 1.3.1 : Find the next highest priority rule instance
    GiveGift(?w = marie,?p = beautyShower) [marked as already executed]
    PrintProduct(?p = beautyShower) [marked as already executed]
End of the production rule engine cycle
```

Without properly taking into account OWL2 reasoning driven by the OWL2 axioms of the T-Box in conjunction with the A-Box no production rule instance would have been executed at all. The simplest way to combine production rules and OWL2 ontologies for execution purpose while taking into account OWL2 reasoning is to build a loose coupling between a production rule engine and an OWL2 reasoner. The task of an OWL2 Reasoner is to answer queries on the ontology (for instance, is marie a Person ?, give me the set of all the products marie has bought). The valuation of the conditions of the production rules can be partly implemented with those queries. The production rule engine generates queries from the conditions. The OWL2 reasoner answers the queries providing the valuations for the conditions. During the valuation of the conditions the population is only observed. This loose coupling approach seems perfectly acceptable.

But production rules provide the unique ability over logical rules to update the population of the knowledge base using the action such that the update contradicts the condition:

```
production rule ChangeOfMind {
    when {
        Person(?p);
        Book(?b);
        hasBought(?p,?b); //yes, ?p is buying ?b
    }
    then {
        remove hasBought(?p,?b); // no, ?p no longer buys ?b
    }
}
```

OWL2 reasoning also needs to be taken into account for any update action (add or remove) on the population and this is where the loose coupling approach is falling short when compared to the tight coupling approach of the embodiments.

An example to illustrate the problem is a simple T-Box and production ruleset:

```
    class Person;
    class Man << Person;    // Man is a subclass of Person
    class Woman << Person; // Woman is a subclass of Person
class Man <> Woman;    // Man is disjoint from Person
production rule PrintWoman { // highest priority
    when {
        Woman(?p);
    }
    then {
        println(?p + " is a Woman");
    }
}
production rule Woman2Man { // mid priority
    when {
        Woman(?p);
    }
    then {
        insert Man(?p);
    }
}
production rule PrintMan { // lowest priority
    when {
        Man(?p);
    }
    then {
        println(?p + " is a Man");
    }
}
```

With the following A-Box:
Woman(marie)
The detailed execution steps of a loose coupling between a traditional production rule engine that would delegate OWL2 queries to an OWL2 reasoner for the condition valuation steps is the following:

```
Step 2.0 : Loading of the A-Box in the local memories of the RETE:
    [A-Box assertion #1]: Woman(marie)
    (marie) is added to the instances of Woman
    (marie) is added to the instances of Person using the
    axiom: class Woman << Person
    (?p = marie) is added to the instances of PrintWoman
    (?p = marie) is added to the instances of Woman2Man
Step 2.1.1: Find the next highest priority rule instance
    PrintWoman(?p = marie) [next highest]
    Woman2Man(?p = marie)
Step 2.1.2: Execute the action of PrintWoman(?p = marie)
    println(marie + " is a Woman")
Step 2.2.1: Find the next highest priority rule instance
    PrintWoman(?p = marie) [marked as already executed]
    Woman2Man(?p = marie) [next highest]
Step 2.2.2: Execute the action of Woman2Man(?p = marie)
    insert Man(marie)
```

But the A-Box now contains: Woman(marie) and Man(marie) which is inconsistent with the T-Box axiom: class Man < > Woman (marie cannot be both a Woman and a Man). The behavior of reasoner 210 when faced an inconsistent ontology depends on the particular embodiment. An exception is thrown; the production rule engine cycle is stopped which is undesirable for a deployed stand-alone application; or the A-box is left in an inconsistent state because it still contains the two assertions (it is corrupted, it cannot be used anymore). Moreover, the exception is not necessarily thrown when the inconsistency is introduced. It can be thrown the next time the reasoner is asked to answer a query involving this part of the A-Box. With such a latency between the cause and the effect, debugging the combination is becoming very difficult, or only one of the two assertions Woman(marie) or Man(marie) is considered in query results: The production rule engine cycle is not stopped, nut the A-box is left in an inconsistent state because it still contains the two assertions (it is corrupted, it cannot be used anymore by a different semantic tool).

The reasoner does not manage the update of the A-Box. It is only there to answer the queries. The update of the A-Box has to be done outside of the reasoner thanks to another software component sometimes called an ontology manager. After what the OWL2 reasoner can nevertheless be asked to perform a global consistency check on the ontology to detect inconsistencies. This is a costly operation from a performance standpoint especially if it is performed after each atomic update action. At this point, the inconsistencies are detected but not fixed. An inconsistency fixing strategy has to be implemented using all the possible results of the consistency check.

From a logical standpoint the inconsistency of the example is introduced because the production rule is not "well written". It should be written as:

```
production rule Woman2Man { // mid priority
    when {
        Woman(?p);
    }
    then {
        remove Woman(?p); // be sure ?p is not a Woman
        insert Man(?p); // before stating ?p is a Man
    }
}
```

But this is nothing else than asking the author of the production rule to hard code the OWL2 axiom: class Man < > (is disjoint from) Woman which is nevertheless available in the T-Box. It would be unrealistic to ask the authors of the production rules to be aware of the T-Box and to mentally take into account OWL2 reasoning as they are writing production rules. OWL2 axioms are powerful and OWL2 reasoning is complex. OWL2 ontologies are not immutable descriptions. They need to be modified to reflect the latest state of the knowledge (a computer model of what is going on in the real world). This knowledge changes in a way which is not logically consistent (for instance, bad customers are becoming good when they finally buy enough goods, people are getting older each year moving from the young to old categories, and so on). Some tooling needs to be provided for the authors of the production rules to write production rules over ontologies that update the ontology in a way which is both expected (reflecting the intention of the authors) and maintained logically consistent so that the ontology can be re-used by other semantic tools.

In comparison, the execution trace of the extended production rule engine (the original first version of the rule Woman2Man is considered):

```
Step 3.0: Loading of the A-Box in the local memories of the RETE:
    [A-Box assertion #1]: Woman(marie)
    (marie) is added to the instances of Woman
    (marie) is added to the instances of Person using the axiom:
    class Woman << Person,
    (?p = marie) is added to the instances of PrintWoman
    (?p = marie) is added to the instances of Woman2Man
Step 3.1.1: Find the next highest priority rule instance
    PrintWoman(?p = marie) [next highest]
    Woman2Man(?p = marie)
Step 3.1.2: Execute the action of PrintWoman(?p = marie)
    println(marie + " is a Woman")
Step 3.2.1: Find the next highest priority rule instance
    PrintWoman(?p = marie) [marked as already executed]
    Woman2Man(?p = marie) [next highest]
Step 3.2.2: Execute the action of Woman2Man(?p = marie)
    insert Man(marie)
```

The axiom class Man < > Woman is now taken into account in the actions: remove Woman(marie) is now automatically performed; the A-Box now only contains: Man (marie) and is logically consistent with the T-Box; Print-Woman(?p=marie) is removed (the valuation of its condition has been removed; Woman2Man(?p=marie) is removed (the valuation of its condition has been removed); (?p=marie) is added to the instances of PrintMan

```
Step 3.3.1: Find the next highest priority rule instance
    PrintMan(?p = marie) [next highest]
    Step 3.3.2: Execute the action of PrintMan(?p = marie)
    println(marie + " is a Man")
    Step 3.4,1: Find the next highest priority rule instance
    PrintMan(?p = marie) [marked as already executed]
End of the production rule engine cycle
```

All the highest priority rule instances that could be valuated with the latest state of the A-Box have been executed. The A-Box update has been properly performed as part of the production rule engine cycle. The A-Box at the end of the production rule engine cycle is logically consistent with the T-Box. The ontology (T-Box+A-Box) can be re-used by any other semantic tool.

The tight combination between production rules and OWL2 ontologies is dedicated to non-monotonic update (the effect of an action may contradict the condition). Update is a dimension that is not yet considered for OWL2. While adding the update capability, the combination is not fully supporting the OWL2 semantics designed for logical queries (without non monotonic update as the query is being processed). The combination cannot even be related to a particular OWL2 profile. Because those profiles (QL, RL, EL) are only dedicated to more or less complex reasoning capabilities during querying. No OWL2 profile for update is available.

The main limitations with respect to the OWL2 semantics are related to the Open World Assumption (OWA) and to the Non Unique Name Assumption (Non-UNA). The OWA is used in OWL2 to create the assertions that needs to be there but are not mentioned in the ontology. The Non-UNA gives the capability for an individual to have different names.

For instance consider the following ontology:

```
    // T-Box
    class Wheel;
    property hasWheels;
    class Bike == some(hasWheels,==2)!Wheel;
    // A-Box
    Bike(myBike);
```

The wheels of myBike are not mentioned even if as a Bike, myBike has two wheels. With the OWA, an OWL2 reasoner will be able to create on the fly two new assertions involving two new different individuals to denote the missing wheels of myBike if it needs to. It will need to for instance when asked to answer the query hasWheels(myBike,?w) which is supposed to valuate ?w with the wheels. This is fine for a single query. But if the reasoner is asked to answer the same query again later, it would be good not to create two assertions involving two new individuals again for the wheels of myBike. Because the application that invokes the reasoner will be in trouble if it has kept references to the previous wheel individuals.

Now consider the following A-Box:

```
    Bike(myBike);
    hasWheel(myBike,wheel1)
    hasWheel(myBike,wheel2)
    hasWheel(myBike,wheel3)
```

Even if a Bike is expecting 2 wheels, 3 are provided. In OWL2, the ontology is not inconsistent. The OWL2 reasoner will simply use the Non-UNA to consider that two wheels among the three are the same.

Those OWL2 assumptions are necessary to be able to create knowledge which is not known and to reconcile this knowledge with effective knowledge when it becomes known inside a logical query, but they are too complex when update is involved.

In the preferred embodiment, a production rule will first explicitly create new named individuals in its action part and pass them as arguments when assertions are also explicitly added to the A-Box in the remaining part of its action part. A) Importing an OWL2 ontology that contains A-Box assertions such as Bike(myBike) or write a production rule action such as insert Bike(myBike) is not supported in the preferred embodiment because they are likely to require OWA and non-UNA and means can be provided to detect these at compile time. B) However with the following A-Box:

```
    hasWheel(myBike,wheel1)
    hasWheel(myBike,wheel2)
```

Thus, myBike is properly classified as a Bike in the preferred embodiment.

In A) the some(hasWheels,==2)!Wheel restriction is crossed in backward and in B) in forward. The RETE is designed for the forward path. It can support a significant amount of backward paths but not all.

Ontology Description

The embodiments are a tight combination between production rules and OWL2 Axioms. The RETE technology is extended to process the OWL2 Axioms. The production rules are written according to the descriptions available in the T-Box of the OWL2 ontology. The conditions of the production rules can embed OWL2 expressions in predicate position in atomic conditions. The OWL2 axioms are also taking OWL2 expressions as arguments. The embodiments are a tight coupling that makes no difference between the compilation of an OWL2 expression involved in a rule condition and the compilation of an OWL2 expression involved in an OWL2 axiom.

Here is for instance how OWL2 expressions are involved in OWL2 axioms:

```
class GoodCustomer // OWL2 atomic expression (left argument)
==           // OWL equivalentClasses axiom
(Good && Customer) // OWL2 intersectionOf expression (right arg.)
;
```

The terminology of the ontology is described in three parts. In Ontology Part I, the OWL2 axioms are considered individually. In Ontology Part II there is described how complex OWL2 expressions can be embedded in a RETE production rule engine (compiled to a piece of extended RETE involving new expression nodes). In Ontology Part III the new language terms are described, the language is referred to as Tight.

Ontology Part I.

For each individual axiom, the compilation scheme is first described. And the operational semantics is next described. At runtime the expression RETE nodes are stateful. A local memory is associated to each expression node. This local memory denotes the extension of the expression (its set of instances). A local memory is made of tuples. Each tuple represents the arguments of a fact (for instance, the tuple (marie) in the instances of Person denotes the fact Person (marie)). A binary axiom node has two expression arguments. As a RETE node, it is there to control that the instances of the two expressions are always satisfying the logical behavior it is implementing (for instance that the two sets of instances are equivalent, or a subset of one another, and so on). At runtime, A RETE is also incremental. It means that atomic add and remove change events are propagated in the RETE. Each change event is valuated with a tuple that denote a fact that has changed (it has been added or removed). The local memories of the RETE nodes are updated according to the valuation of the change events that are received. The RETE nodes are also responsible for propagating new change events to their neighbor nodes so as to maintain the global logical consistency of the state of the RETE. In order to simplify the descriptions in the text below any sentence of the form "a node adds/removes a tuple to/from a node" should be interpreted as "a node propagates an add/remove change event valuated with a tuple to a node". As any other RETE nodes, a RETE axiom node receives change events. Both the add and the remove change events are considered in the description of the operational semantics of the axiom nodes. A unary axiom node has a single expression argument. It is there to control that the instances of the argument expression are always satisfying the logical behavior it is implementing (for instance that a property expression is symmetric). The details of the axiom nodes that are added to the RETE are described in more detail below.

SubNode:

An OWL2 subClassOf(SubExpr,SuperExpr) axiom, also noted "class SubExpr <<SuperExpr;" in the Tight presentation syntax, is compiled to a new SubNode extended RETE axiom node. SubExpr and SuperExpr denote respectively the sub OWL2 expression and the super expression the axiom is connecting. SubExpr is first compiled to a piece of extended RETE, say RETE[SubExpr]. SuperExpr is next compiled to a piece of extended RETE, say RETE[SuperExpr]. An instance of SubNode is then added as a new result node of the RETE[SubExpr] and as a new result node of RETE[SuperExpr].

A SubNode is a stateless RETE node: there is no local memory associated to it. It is only there to propagate change events between the two pieces of RETE it is connecting.

The operational semantics of the SubNode is the following When a tuple is added to the result node of RETE [SubExpr], the SubNode adds this same tuple to the result node of RETE[SuperExpr]. The reason is that a Sub is necessarily a Super (For instance: a Man is necessarily a Person).

When a tuple is added to the result node of RETE [SubExpr], the SubNode does nothing. The reason is that a Super is not necessarily a Sub (For instance a Person is not necessarily a Woman).

When a tuple is removed the result node of RETE [SubExpr], the SubNode does nothing. The reason is that removing the fact that a tuple is not a Sub does not mean that this tuple is not a Super anymore (For instance removing the fact that an individual is a Woman does not mean that this individual is not Person anymore).

When a tuple is removed from the result node of RETE [SuperExpr], the SubNode removes this same tuple from the result node of RETE[SubExpr]. The reason is that removing the fact that a tuple is not a Super anymore means that this tuple cannot be a Sub anymore (For instance removing the fact that an individual is a Person means that this individual cannot be a Woman anymore).

In Tight the Sub node can connect pieces of RETE that denote predicates of arity >2 (not only classes and properties as it is the case in OWL2) provided the two arguments are of the same arity. But for OWL2, it means that the SubNode is also used to compile the subObjectProperties(SubExpr, SuperExpr) and the subDataProperties(SubExpr,SuperExpr) axioms.

EquivalentNode:

An OWL2 equivalentClasses(LeftExpr,RightExpr) axiom, also noted "class LeftExpr=RightExpr;" in the Tight presentation syntax, is compiled to a new EquivalentNode extended RETE axiom node. LeftExpr and RightExpr denote respectively the left OWL2 expression and the right expression the axiom is connecting. LeftExpr is first compiled to a piece of extended RETE, say RETE[LeftExpr]. RightExpr is then compiled to a piece of extended RETE, say RETE[RightExpr]. An instance of EquivalentNode is then added as a new result node of RETE[LeftExpr] and as a new result node of RETE[RightExpr].

An EquivalentNode is a stateless RETE node: there is no local memory associated to it. It is only there to propagate change events between the two pieces of RETE it is connecting.

The operational semantics of the EquivalentNode is the following:

When a tuple is added to the result node of RETE [LeftExpr], the EquivalentNode adds this same tuple to the result node of RETE[RightExpr]. The reason is that a Left is necessarily a Right (For instance, assuming class Man=Boy: a Man is necessarily a Boy).

When a tuple is added to the result node of RETE [RightExpr], the EquivalentNode adds this same tuple to the result node of RETE[LeftExpr]. The reason is that a Right is necessarily a Left (For instance, a Boy is necessarily a Man).

When a tuple is removed from the result node of RETE [LeftExpr], the EquivalentNode removes this same tuple from the result node of RETE[RightExpr]. The reason is still that a Left is necessarily a Right (For instance, when an individual is not a Man anymore, the individual cannot be a Boy anymore).

When a tuple is removed from the result node of RETE [RightExpr], the EquivalentNode removes it from the result node of RETE[LeftExpr]. The reason is that a Right is necessarily a Left (For instance, when an individual is not a Man anymore, the individual cannot be a Boy anymore).

In Tight the EquivalentNode can connect pieces of RETE that denote predicates of arity >2 (not only classes and properties as it is the case in OWL2) provided the two arguments are of the same arity. But for OWL2, it means that the EquivalentNode is also used to compile the equivalentObjectProperties(LeftExpr,RightExpr) and the equivalentDataProperties(LeftExpr,RightExpr) axioms.

DisjointNode:

An OWL2 disjointClasses(LeftExpr,RightExpr) axiom, also noted "class LeftExpr < > RightExpr;" in the Tight presentation syntax, is compiled to a new DisjointNode extended RETE axiom node. LeftExpr and RightExpr denote respectively the left OWL2 expression and the right expression the axiom is connecting. LeftExpr is first compiled to a piece of extended RETE, say RETE[LeftExpr]. RightExpr is then compiled to a piece of extended RETE, say RETE[RightExpr]. An instance of DisjointNode is then added as a new result node of RETE[LeftExpr] and as a new result node of RETE[RightExpr].

A DisjointNode is a stateless RETE node: there is no local memory associated to it. It is only there to propagate change events between the two pieces of RETE it is connecting.

The operational semantics of the DisjointNode is the following:

When a tuple is added to the result node of RETE [LeftExpr], the DisjointNode removes this same tuple from the result node of RETE[RightExpr]. The reason is that a Left is necessarily not a Right (For instance, a Man is necessarily not a Woman).

When a tuple is added to the result node of RETE [RightExpr], the DisjointNode removes it from the result node of RETE[LeftExpr]. The reason is that a Right is necessarily not a Left (For instance, a Woman is necessarily not a Man).

When a tuple is removed from the result node of RETE [LeftExpr], the DisjointNode does nothing. The reason is that not being a Left anymore does not mean to be a Right (For instance, when an individual is not a Man anymore, the individual is not necessarily a Woman). The arguments of the DisjointNode are only disjoint. They are not the complement of each other which would be a stronger logical claim.

When a tuple is removed from the result node of RETE [RightExpr], the DisjointNode does nothing. The reason is that not being a Right anymore does not mean being a Left (For instance, when an individual is not a Woman anymore, the individual is not necessarily a Man).

In Tight the DisjointNode can connect pieces of RETE that denote predicates of arity >2 (not only classes and properties as it is the case in OWL2) provided the two arguments are of the same arity. But for OWL2, it means that the DisjointNode is also used to compile the disjointObjectProperties(LeftExpr,RightExpr) and the disjointDataProperties(LeftExpr,RightExpr) axioms.

DisjointUnionNode:

An OWL2 disjointUnionClasses(Class,Expr, . . . ) axiom is compiled to a new DisjointUnionNode extended RETE axiom node. Class denotes the OWL2 class that is defined as the union of all the disjoint alternate Expr OWL2 class expressions. Class is first compiled to a piece of extended RETE, say RETE[Class]. Each Expr is then compiled to a piece of extended RETE, say RETE[Expr]. An instance of DisjointUnionNode is then added as a new result node of RETE[Class] and as a new result node of each of the RETE[Expr].

A DisjointUnionNode is a stateless RETE node: there is no local memory associated to it. It is only there to propagate change events between the pieces of RETE it is connecting.

The operational semantics of the DisjointUnionNode is the following (assuming there is at least 2 Expr involved):

When a tuple is added to the result node of RETE[Class], there is an issue because there is a choice point. The tuple should be added to the result node of only one of the RETE[Expr] but the DisjointUnionNode does not know which one to choose (For instance if Person is defined as the disjoint union of Man and Woman and if marie is Person, is she a Man or a Woman ?), This issue is similar to the issue that is discussed for UnionNode later on. Please read the section about UnionNode to have an explanation on the issue, When a tuple is added to the result node of one of the RETE[Expr], the DisjointUnionNode removes it from the result nodes of all the others RETE[Expr]. Then the DisjointUnionNode adds it to the result node of RETE[Class].

When a tuple is removed from the result node of RETE [Class], the DisjointUnionNode removes it from the result nodes of all the RETE[Expr].

When a tuple is removed from the result node of one of the RETE[Expr], the DisjointUnionNode removes it from the result node of RETE[Class].

In Tight the DisjointUnionNode can connect pieces of RETE that denote predicates of arity >1 (not only classes as it is the case in OWL2) provided all the arguments are of the same arity. Moreover Class is not limited to a predicate name, it can be an expression.

InverseNode:

An OWL2 inverseObjectProperties(LeftExpr,RightExpr) axiom, also noted "property LeftExpr inverse RightExpr;" in the Tight presentation syntax, is compiled to a new InverseNode extended RETE axiom node. LeftExpr and RightExpr denote respectively the left OWL2 expression and the right expression the axiom is connecting. LeftExpr is first compiled to a piece of extended RETE, say RETE[LeftExpr]. RightExpr is then compiled to a piece of extended RETE, say RETE[RightExpr]. An instance of InverseNode is then added as a new result node of RETE[LeftExpr] and as a new result node of RETE[RightExpr].

An InverseNode is a stateless RETE node: there is no local memory associated to it. It is only there to propagate change events between the two pieces of RETE it is connecting.

The operational semantics of the InverseNode is the following:

When a tuple is added to the result node of RETE [LeftExpr], the InverseNode adds the inverse of the tuple to the result of the RightExpr node (For instance, assuming property purshasedBy inverse hasPurshased; when (beautyShower,marie) is added to purshasedBy, the InverseNode adds(marie,beautyShower) to the result of hasPurshased)).

When a tuple is added to result node of RETE[RightExpr], the InverseNode adds the inverse of the tuple to the result node of RETE[LeftExpr] (For instance, when (marie,beautyShower) is added to hasPurshased, the InverseNode adds (beautyShower,marie) to the result of purshasedBy)).

When a tuple is removed from the result node of RETE [LeftExpr], the InverseNode removes the inverse of the tuple from the result node of RETE[RightExpr] (For instance, when (beautyShower,marie) is removed from purshasedBy, (marie,beautyShower) is removed from the result of hasPurshased)).

When a tuple is removed from the result node of RETE [RightExpr], the InverseNode removes the inverse of the tuple from the result node of RETE[LeftExpr] (For instance, when (marie,beautyShower) is removed from hasPurshased, (beautyShower,marie) is removed from the result of purshasedBy)).

In Tight the InverseNode can connect pieces of RETE that denote predicates of arity !=2 (not only properties as it is the case in OWL2) provided the two arguments are of the same arity.

DomainNode:

An OWL2 objectPropertyDomain(PropertyExpr,ClassExpr) axiom or an OWL2 dataPropertyDomain(PropertyExpr,ClassExpr) axiom also noted "property PropertyExpr {domain ClassExpr;};" in the Tight presentation syntax, is compiled to a new DomainNode extended RETE axiom node. PropertyExpr denotes the OWL2 property expression and ClassExpr denotes the OWL2 class expression the axiom is connecting. PropertyExpr is first compiled to a piece of extended RETE, say RETE[PropertyExpr]. ClassExpr is then compiled to a piece of extended RETE, say RETE[ClassExpr]. An instance of DomainNode is then added as a new result node of RETE[PropertyExpr] and as a new result node of RETE[ClassExpr].

A DomainNode is a stateless RETE node: there is no local memory associated to it. It is only there to propagate change events between the two pieces of RETE it is connecting.

The operational semantics of the DomainNode is the following:

When a tuple is added to the result node of RETE [PropertyExpr], the DomainNode adds a tuple that only contains the subject to the result node of RETE[ClassExpr] (For instance, when (marie,beautyShower) is added to hasBought, (marie) is added to the result of Person)).

When a tuple is added to the result node of RETE [ClassExpr], the DomainNode does nothing (For instance, knowing that marie is a Person does not add any knowledge about a Product what she hasBought).

When a tuple is removed from the result node of RETE [PropertyExpr], the DomainNode does nothing (For instance, the fact that marie is not buying beautyShower anymore does not mean that she is not a Person anymore).

When a tuple is removed from the result node of RETE [ClassExpr], it is a class tuple with a single element: a subject individual. The DomainNode removes all the property couples with the same subject from the result node of RETE[PropertyExpr] (For instance, when (marie) is removed from Person, the A-Box cannot contain any property assertion that describes a Product marie hasBought anymore).

RangeNode:

An OWL2 objectPropertyRange(PropertyExpr,ClassExpr) axiom also noted "property PropertyExpr {range ClassExpr;};" in the Tight presentation syntax, is compiled to a new RangeNode extended RETE axiom node. PropertyExpr denotes the OWL2 property expression and ClassExpr denotes the OWL2 class expression the axiom is connecting. PropertyExpr is first compiled to a piece of extended RETE, say RETE[PropertyExpr]. ClassExpr is then compiled to a piece of extended RETE, say RETE [ClassExpr]. An instance of RangeNode is then added as a new result node of RETE[PropertyExpr] and as a new result node of RETE[ClassExpr].

A RangeNode is a stateless RETE node: there is no local memory associated to it. It is only there to propagate change events between the two pieces of RETE it is connecting.

The operational semantics of the RangeNode is the following:

When a tuple is added to the result node of RETE [PropertyExpr], the RangeNode adds a tuple that only contains the object to the result node of RETE[ClassExpr] (For instance, when (marie,beautyShower) is added to hasBought, (beautyShower) is added to the result of Product)).

When a tuple is added to the result node of RETE [ClassExpr], the RangeNode does nothing (For instance, knowing that beautyShower is a Product does not mean that marie hasBought it).

When a tuple is removed from the result node of RETE [PropertyExpr], the RangeNode does nothing (For instance, the fact that marie is not buying beautyShower anymore does not mean that beautyShower is not a Product anymore).

When a tuple is removed from the result node of RETE [ClassExpr], it is a class tuple with a single element: an object individual. The RangeNode removes all the property couples with the same object from the result node of RETE[PropertyExpr] (For instance, when (beautyShower) is removed from Product, the A-Box cannot contain any property assertion that states that an individual hasBought beautyShower).

RestrictionNode:

An OWL2 dataPropertyRange(PropertyExpr,DataRange) axiom also noted "property PropertyExpr {range DataRange;};" in the Tight presentation syntax, is compiled to a new RestrictionNode. PropertyExpr denotes the OWL2 property expression and DataRange denotes the OWL2 data range restriction. PropertyExpr is first compiled to a piece of extended RETE, say RETE[PropertyExpr]. DataRange is then compiled to a RETE restriction formula similar to the formula involved in filter RETE nodes, say RETE[DataRange]. This formula is introducing a single variable. At runtime this variable will be valuated with the object data values that are the second element of the tuples coming from RETE[PropertyExpr] as change events are received. An instance of RestrictionNode with RETE[DataRange] as argument is then added as a new result node of RETE [PropertyExpr]

A RestrictionNode is a stateless RETE node: there is no local memory associated to it. It is only there to check that the instances of the result node of RETE[PropertyExpr] satisfy the restriction formula.

The operational semantics of the RestrictionNode is the following.

When a couple is added to the result node of RETE [PropertyExpr], the object (the second element of the couple) is extracted. The data range restriction formula is applied. If the object satisfies the restriction, nothing more happens. If the object does not satisfy the restriction, the RestrictionNode removes the couple from the result node of RETE[PropertyExpr].

When a couple is removed from the result node of RETE[PropertyExpr], the RestrictionNode does nothing as the fact that the object satisfies or not the restriction is pointless now that the couple has been removed from the instances of the result node of RETE [PropertyExpr].

The RestrictionNode is not restricted to data range restriction. It can be used for any sort of restriction.FunctionalNode:

An OWL2 functionalObjectProperty(PropertyExpr) or functionalDataProperty(PropertyExpr) axiom also noted "property PropertyExpr {functional;};" in the Tight presentation syntax, is compiled to a new FunctionalNode extended RETE axiom node. PropertyExpr denotes the OWL2 property expression to restrict. PropertyExpr is first compiled to a piece of extended RETE, say RETE[PropertyExpr]. An instance of FunctionalNode is then added as a new result node of RETE[PropertyExpr].

A FunctionalNode is a stateless RETE node: there is no local memory associated to it. It is only there to check that the instances of the result node of RETE[PropertyExpr] always satisfy the functional restriction: there is at most one object for a subject.

The operational semantics of the FunctionalNode is the following:

When a couple is added to the result node of RETE [PropertyExpr], the object (the second element of the couple) is extracted. It is also the most recent object as it is received in a new propagation and the older couples are in the local memory of the result node of RETE[PropertyExpr]. The subject (the first element of the tuple) is also extracted. Any couple of the result node of RETE[PropertyExpr] that involves the same subject but a different object (necessarily older) is removed from the result node of RETE[PropertyExpr].

When a couple is removed from the result node of RETE[PropertyExpr], the FunctionalNode does nothing as the removed couple is necessarily the most recent and only one for its subject. Having no object for a subject is acceptable for the functional restriction. It means that the object becomes unknown.

InverseFunctionalNode:

An OWL2 inverseFunctionalObjectProperty(PropertyExpr) axiom also noted "property PropertyExpr {inverse functional;};" in the Tight presentation syntax, is compiled to a new InverseFunctionalNode extended RETE axiom node. PropertyExpr denotes the OWL2 property expression to restrict. PropertyExpr is first compiled to a piece of extended RETE, say RETE[PropertyExpr]. An instance of InverseFunctionalNode is then added as a new result node of RETE[PropertyExpr].

An InverseFunctionalNode is a stateless RETE node: there is no local memory associated to it. It is only there to check that the instances of the result node of RETE[PropertyExpr] always satisfy the inverse functional restriction: there is at most one subject for an object.

The operational semantics of the InverseFunctionalNode is the following:

When a couple is added to the result node of RETE [PropertyExpr], the subject (the first element of the couple) is extracted. It is also the most recent subject as it is received in a new propagation and the older couples are in the local memory of the result node of RETE[PropertyExpr]. The object (the second element of the tuple) is also extracted. Any couple of the result node of RETE[PropertyExpr] that involves the same object but a different subject (necessarily older) is removed from the result node of RETE[PropertyExpr].

When a couple is removed from the result node of RETE[PropertyExpr], the InverseFunctionalNode does nothing as the removed couple is necessarily the most recent and only one for its object. Having no subject for an object is acceptable for the inverse functional restriction. It means that the subject becomes unknown.

ReflexiveNode:

An OWL2 reflexiveObjectProperty(PropertyExpr) axiom also noted "property PropertyExpr {reflexive;};" in the Tight presentation syntax, is compiled to a new ReflexiveNode extended RETE axiom node. PropertyExpr denotes the OWL2 property expression to restrict. PropertyExpr is first compiled to an extended RETE expression node, say RETE[PropertyExpr]. An instance of ReflexiveNode is then added as a new result node of RETE [PropertyExpr].

A ReflexiveNode is a stateless RETE node: there is no local memory associated to it. It is only there to check that the instances of the result node of RETE[PropertyExpr] always satisfy the reflexive restriction.

The operational semantics of the ReflexiveNode is the following:

When a couple (S,O) is added to the result node of RETE[PropertyExpr], the subject S (the first element of the couple) is extracted. The ReflexiveNode adds the couple (S,S) to the result node of RETE[PropertyExpr]. The object O (the second element of the couple) is also extracted. The ReflexiveNode also adds the couple (O,O) to the result node of RETE [PropertyExpr].

When a couple (S,O) is removed from the result node of RETE[PropertyExpr], the subject S (the first element of the couple) is extracted. If (S,S) is still in the instances of the result node of RETE[PropertyExpr], the ReflexiveNode does nothing. It not, the ReflexiveNode removes any couple (S,?x) from the result node of RETE[PropertyExpr]. The object O (the second element of the couple) is also extracted. If (O,O) is still in the instances of the result node of RETE[PropertyExpr], the ReflexiveNode does nothing. It not, the ReflexiveNode removes any couple (?y,?O) from the result node of RETE[PropertyExpr].

IrreflexiveNode:

An OWL2 irreflexiveObjectProperty(PropertyExpr) axiom also noted "property PropertyExpr {irreflexive;};" in the Tight presentation syntax, is compiled to a new IrreflexiveNode extended RETE axiom node. PropertyExpr denotes the OWL2 property expression to restrict. PropertyExpr is first compiled to a piece of extended RETE, say RETE [PropertyExpr]. An instance of IrreflexiveNode is then added as a new result node of RETE [PropertyExpr].

An IrreflexiveNode is a stateless RETE node: there is no local memory associated to it. It is only there to check that the instances of the result node of RETE[PropertyExpr] always satisfy the irreflexive restriction.

The operational semantics of the IrreflexiveNode is the following:

When a couple (S,O) is added to the result node of RETE[PropertyExpr], the subject S (the first element of the couple) is extracted. The IrreflexiveNode removes the couple (S,S) from the result node of RETE[PropertyExpr] if it is there. The object O (the second element of the couple) is also extracted. The IrreflexiveNode also removes the couple (O,O) from the result node of RETE[PropertyExpr] if it is there.

When a couple is removed from the result node of RETE[PropertyExpr], the IrreflexiveNode does nothing as it has removed the irreflexive couples on add events and only a couple that has been added can generate a remove event.

SymmetricNode:

An OWL2 symmetricObjectProperty(PropertyExpr) axiom also noted "property PropertyExpr {symmetric;};" in the Tight presentation syntax, is compiled to a new SymmetricNode extended RETE axiom node. PropertyExpr denotes the OWL2 property expression to restrict. PropertyExpr is first compiled to a piece of extended RETE, say RETE[PropertyExpr]. An instance of SymmetricNode is then introduced added as a new result node of RETE [PropertyExpr].

A SymmetricNode is a stateless RETE node: there is no local memory associated to it. It is only there to check that the instances of the result node of RETE[PropertyExpr] always satisfy the symmetric restriction.

The operational semantics of the SymmetricNode is the following:

When a couple is added to the result node of RETE [PropertyExpr], the SymmetricNode adds the inverse of the couple to the result node of RETE[PropertyExpr] (the inverse of the couple (S,O) is the couple (O,S)).

When a couple is removed from the result node of RETE[PropertyExpr], the SymmetricNode removes the inverse of the couple from the result node of RETE[PropertyExpr].

AsymmetricNode:

An OWL2 asymmetricObjectProperty(PropertyExpr) axiom also noted "property PropertyExpr {asymmetric;};" in the Tight presentation syntax, is compiled to a new AsymmetricNode extended RETE axiom node. PropertyExpr denotes the OWL2 property expression to restrict. PropertyExpr is first compiled to a piece of extended RETE, say RETE[PropertyExpr]. An instance of AsymmetricNode is then added as a new result node of RETE [PropertyExpr].

An AsymmetricNode is a stateless RETE node: there is no local memory associated to it. It is only there to check that the instances of the result node of RETE[PropertyExpr] always satisfy the asymmetric restriction.

The operational semantics of the AsymmetricNode is the following:

When a couple is added to the result node of RETE [PropertyExpr], the AsymmetricNode removes the inverse of the couple from the result node of RETE [PropertyExpr].

When a couple is removed from the result node of RETE[PropertyExpr], the AsymmetricNode does nothing as asymmetric is fully implemented on add events.

TransitiveNode:

An OWL2 transitiveObjectProperty(PropertyExpr) axiom also noted "property PropertyExpr {transitive;};" in the Tight presentation syntax, is compiled to a new TransitiveNode extended RETE axiom node. PropertyExpr denotes the OWL2 property expression to restrict. PropertyExpr is first compiled to a piece of extended RETE, say RETE[PropertyExpr]. An instance of TransitiveNode is then added as a new result node of RETE [PropertyExpr].

A TransitiveNode is a stateless RETE node: there is no local memory associated to it. It is only there to check that the instances of the result node of RETE[PropertyExpr] always satisfy the transitive restriction.

The operational semantics of the TransitiveNode is the following:

When a couple (S,O) is added to the result node of RETE[PropertyExpr], the TransitiveNode extracts all the couples (?x,S) (with the new subject in object position) and adds all the (?x,O) couples to the result node of RETE [PropertyExpr]. The TransitiveNode also extracts all the couples (O,?y) (with the new object in subject position) and also adds all the (S,?y) couples to the result node of RETE[PropertyExpr].

When a couple (S,O) is removed from the result node of RETE[PropertyExpr], the TransitiveNode removes all the couples (S,?x) and (?x,O) that used to justify (S,O). For instance, assuming the instances of the result node of RETE[PropertyExpr] are {(a,b),(b,c),(a,d),(d,c),(a,c)}, when (a,c) is removed, the two justifications for (a,c):(a,b) and (b,c) first, (a,d) and (d,c) next, are removed. (a,c) has already been removed when the result node of RETE[PropertyExpr] has processed the removal before notifying its result nodes, among which the TransitiveNode.

Other OWL2 Axioms:

OWL2 is also providing axioms to define data types and to specify keys. Those two axioms have not yet been implemented.

Impact of the OWL2 Axiom Nodes on the other nodes of the RETE:

Each new binary axiom Axiom(LeftExpr,RightExpr) node is both added as a new result node of RETE[LeftExpr] and as a new result node of RETE[RightExpr]. And each new unary axiom Axiom(Expr) node is added as a new result node of RETE[Expr]. While connecting a new node to one or two result nodes is not surprising, for a RETE node (basic and expression nodes) receiving change events from a result is something new. The RETE is originally designed for forward propagation only: the change events (add tuple or remove tuple) are coming from the input nodes whose instances are the known facts (what is initially in the A-Box). Past the input node, a tuple is always propagated downward from one of the arguments of a node to the node until the output nodes (the production rule nodes) are reached. But propagating a change event upward from the result of a node to the node means going backward in the RETE. Since this is what is happening with axioms, the operational semantics of the RETE nodes that are not axiom nodes needs to be completed to describe what is happening with backward propagation.

Traditional RETE nodes are now described.

PredicateNode:

When a tuple is added to a PredicateNode from its result, there is no particular issue: the tuple is added to the extension of the predicate if it is not already there.

When a tuple is removed from a predicate node from its result, there is no particular issue either: the tuple is removed from the extension of the predicate.

The difference with a top add or a top remove is that it is not necessary to notify the result nodes of the add or the remove since the tuple is precisely coming from the result.

FilterNode:

When a tuple is added to a FilterNode from its result, the FilterNode needs to check whether the tuple satisfies the filter. If the tuple satisfies the filter, the tuple can be added to the extension of the FilterNode. And if it was not already in the extension it is added to the argument of the FilterNode (as an add event coming from the result). If the tuple does not satisfy the filter, there is an inconsistency. The FilterNode has to remove the tuple from its result.

When a tuple is removed from a FilterNode from its result, the FilterNode needs to check whether the tuple is in its extension. If not, there is nothing more to do. If yes it is removed from the extension and from the argument of the FilterNode (as a remove event coming from the result). If the tuple does not satisfy the filter, there was an inconsistency. But the FilterNode does not need to removed the tuple from its result has it has just been done (otherwise no remove event would have reached the FilterNode).

ProductNode:

When a tuple is added to a ProductNode from its result, the ProductNode first checks whether the tuple is not already in its extension. If yes, there is nothing more to do. If not, it splits the tuple in two sub tuples according to the respective arities of its arguments. Then each sub-tuple is added to the corresponding argument (as an add event coming form the result). For instance if (a,b,c) is added from the result of the product node and the first argument has arity 1 and the second argument has arity 2, (a) of length=1 is added to the result of the first argument and (b,c) of length=2 is added to the result of the second argument.

When a tuple is removed from a ProductNode from its result, the ProductNode first checks whether the tuple is in its extension. If not, there is nothing more to do. If yes, it splits the tuple in two sub tuples according to the respective arities of its arguments. Then each sub-tuple is removed from the corresponding argument (as a remove event coming form the result). For instance if (a,b,c) is removed from the result of the ProductNode and the first argument has arity 1 and the second argument has arity 2, (a) of length=1 is removed from the first argument and (b,c) of length=2 is removed from the second argument (both as remove events coming from the result).

JoinNode:

When a tuple is added to a JoinNode from its result, the JoinNode needs to check whether the tuple satisfy the join filter. If the tuple satisfies the join filter, the tuple can be added to the extension of the JoinNode. And if it was not already in the extension the JoinNode splits the tuple in two sub-tuples according to the arities of its two arguments as a ProductNode would do. Then each sub-tuple is added to the corresponding argument as an add event coming from the result. If the tuple does not satisfy the join filter, there is an inconsistency. The JoinNode has to remove the tuple from its result.

When a tuple is removed from a JoinNode from its result, the JoinNode only needs to check whether the tuple is in its extension. If not, there is nothing more to do. If yes, it is removed from the extension. The tuple is then split in two sub tuples according to the arities of the two arguments of the JoinNode as a ProductNode would do. Then the sub tuples are removed from the corresponding arguments of the JoinNode both as remove events coming from the result.
ForkNode:

When a tuple is added to a ForkNode from one of the results of the ForkNode, the ForkNode simply adds this same tuple 1) to its single argument as an add event coming from the result and 2) to its remaining results as a traditional RETE add event coming from the argument. It is important to propagate to the argument first as combinations of RETE nodes are best updated according to the forward path (some backward propagation will not be supported). Hence reaching the input nodes of the RETE as fast as possible when going backward is a valuable heuristic.

When a tuple is removed from a ForkNode from one of the results of the ForkNode, the ForkNode simply removes this same tuple 1) to its single argument as a remove event coming from the result and 2) to its remaining results as a traditional RETE remove event coming from the argument.
ProductionRuleNode:

A ProductionRuleNode is an output node with no result.

Now it is time to consider the OWL2 expression RETE nodes that are added to the traditional RETE nodes before the new RETE Axiom nodes can finally be added:
EnumerationNode:

An EnumerationNode can be considered as an immutable PredicateNode. Its extension is defined once for good.

When a tuple is added to an EnumerationNode from the result, the EnumerationNode checks whether this tuple is in its extension. If yes, there is nothing more to do. If not, there is an inconsistency. The EnumerationNode removes the tuple from its result.

When a tuple is removed from an EnumerationNode from the result, the EnumerationNode checks whether this tuple is in its extension. If not, there is nothing more to do. If yes, there is an inconsistency. The EnumerationNode adds back the tuple to its result (it has already added it to its result when the state of the RETE has been initialized).
IntersectionNode:

When a tuple is added to an IntersectionNode from the result, the IntersectionNode checks whether the tuple is not already in its extension. If yes, there is nothing more to do. If not, the IntersectionNode adds the tuple to its extension. Then it adds the same tuple to its two arguments in sequence (as add events coming from the result).

When a tuple is removed from an IntersectionNode from the result, the IntersectionNode first checks whether the tuple is in its extension. It not, there is nothing more to do. If yes, there is an issue because there is a choice point 1) either the tuple has to be removed from the first argument 2) or either it has to be removed from the second argument 3) or either it has to be removed from both arguments (each time as remove events coming from the result).

In the preferred embodiment the rule engine can statically collect all the assertion actions that have a chance to generate such a runtime issue by performing an abstract interpretation of the extended RETE once it has been compiled.

This is illustrated with the following T-Box (since it is static, there is no A-Box at all):

```
class Plane;
class Boat;
class FlyingBoat == Boat && Plane; // && means intersectionproduction
rule
RemoveFlyingBoat {
when {
    FlyingBoat(?x);
}
then {
    remove FlyingBoat(?x);
}
}
```

The rule engine simulates the propagation of any remove FlyingBoat(?x) in the extended RETE:

```
remove FlyingBoat(?x);
remove (FlyingBoat == Boat && Plane)(?x);
remove (Boat && Plane)(?x);
IntersectionResultRemoveError!
```

But since this static check is optional, the default implementation of the runtime is sending an exception when a remove event reaches an IntersectionNode from the result. This default behavior can be changed by the application that embeds the rule engine. For instance it might be acceptable to stop the processing of the removal at the level of the IntersectionNode without attempting to consider the arguments and without sending any exception.

It is important to understand that remove Boat(?x) or remove Plane(?x) would not generate any issue as they both correspond to the traditional forward propagation path.
UnionNode:

When a tuple is added to a UnionNode from the result, the UnionNode first checks whether the tuple is already in its extension. If yes, there is nothing more to do. If not, there is a choice point which is the dual of the choice point encountered with IntersectionOf and remove 1) either the tuple has to be added to the first argument or 2) either it has to be added to the second argument or 3) either it has to be added to both arguments (each time as add events coming from the result).

In the current implementation the rule engine can statically collect all the assertion actions that have a chance to generate such a runtime issue by performing an abstract interpretation of the extended RETE once it has been compiled.

This is illustrated with the following T-Box (since it is static, there is no A-Box at all):

```
class Man;
class Woman;
class Person == Man || Woman; // || means union
production rule AddPerson {
when {
    Thing(?x);
}
then {
    insert Person(?x);
}
}
```

The rule engine simulates the propagation of any insert Person(?x) in the extended RETE:

```
add Person(?x);
add (Person == Man || Woman)(?x);
add (Man || Woman)(?x);
UnionResultAddError!
```

But since this static check is optional, the default implementation of the runtime is sending an exception when an add event reaches a UnionNode from the result. This default behavior can be changed by the application that embeds the rule engine. For instance it might be acceptable to stop the processing of the add at the level of the UnionNode without attempting to consider the arguments and without sending any exception.

It is important to understand that insert Man(?x) or insert Woman(?x) would not generate any issue as they both correspond to the traditional forward propagation path.

When a tuple is removed from a UnionNode from the result, the UnionNode first checks whether the tuple is already in its extension. If yes, the tuple is first removed the extension and then from both arguments (each time a remove event coming from the result).

DifferenceNode:

When a tuple is added to a DifferenceNode from the result, the DifferenceNode first adds the tuple to its world argument (as an add event coming from the result). Then it checks whether the tuple is already in its extension. If yes, there is nothing more to do. If not, the DifferenceNode adds the tuple to its extension. Then it removes the same tuple from its argument that denotes the difference (as a remove event coming from the result).

When a tuple is removed from a DifferenceNode from the result, the DifferenceNode first adds the tuple to its world argument (as an add event coming from the result). Then it checks whether the tuple is in its extension. It not, there is nothing more to do. If yes, it removes it from its extension and then adds the tuple to its difference argument (as an add event coming from the result).

SomeNode:

When a tuple is added to a SomeNode from the result, the SomeNode checks whether the tuple is already in its extension. If yes, there is nothing more to do. If not, there is generally an issue. The tuple contains a subject. But the knowledge about the objects it is related to thanks to the property might be incomplete. The rule engine would need to create as many different new individuals as the cardinality restriction of the SomeNode specifies missing. This can be done. But what is the impact on the overall understanding of the combination between the production rules and the ontology on the end user ? One of the next production rules might precisely be there to add the individual wheels that are yet missing as assertion actions. Hence, the end user will be faced to sets of wheels: the one the engine has automatically generated and the one it is adding explicitly in the new production rule. At some point the end user will need to add individual equivalence assertions so that the two sets become one. The Open World Assumption and the Non Unique Name Assumption are acceptable within a query. But they are not acceptable for production rules which are using the A-Box to keep track of the latest knowledge which is relevant to the end user.

In the current implementation the rule engine can statically collect all the assertion actions that have a chance to generate such a runtime issue by performing an abstract interpretation of the extended RETE once it has been compiled.

The detection of this issue can be illustrated with a T-Box and a production rule:

```
class Wheel;
property hasWheels;
class AtLeastTwoWheels = some(hasWheels,>= 2)!Wheel;
production rule AddAtLeastTwoWheels {
when {
    Thing(?x);
}
then {
    insert AtLeastTwoWheels (?x);
}
}
```

The rule engine simulates the propagation of any insert AddAtLeastTwoWheels (?x) in the extended RETE:

```
add AddAtLeastTwoWheels (?x);
add (AtLeastTwoWheels = some(hasWheels,>= 2)!Wheels)(?x);
add (some(hasWheels,>= 2)!Wheels)(?x);
SomeResultAddError!
```

But since this static check is optional, the default implementation of the runtime is sending an exception when an add event reaches a SomeNode from the result. This default behavior can be changed by the application that embeds the rule engine. For instance it might be acceptable to stop the processing of the add at the level of the SomeNode without attempting to add the missing property assertions and without sending any exception.

It is important to understand that insert hasWheels(?x,?w) or insert Wheel(?x) would not generate any issue as they both correspond to the traditional forward propagation path.

When a tuple is removed from a SomeNode from the result, the SomeNode checks whether the tuple is already in its extension. If no, there is nothing more to do. If yes, there is generally an issue. The tuple contains a subject. But the property assertions will need to be updated to reflect the fact that the subject cannot be considered as an instance of the SomeNode anymore. The issue is that there are generally many ways to update the property assertions to do so.

In the current implementation the rule engine can statically collect all the assertion actions that have a chance to generate such a runtime issue by performing an abstract interpretation of the extended RETE once it has been compiled in a way that is similar to the way explained for add.

Other extended RETE Expression Nodes dedicated to Property Restrictions:

Similar issues are encountered for the remaining extended RETE expression nodes dedicated to property restriction when a tuple is added to or removed from the node from its result. Those issues are all statically detected as it is the case for the SomeNode. Those other nodes are the following: SomeFormulaNode, AllNode, and AllFormulaNode.

HasValueNode:

When a tuple is added to a HasValueNode from the result, the HasValueNode first checks whether the tuple is in its extension. If yes, there is nothing more to do. If no, the added tuple (S) contains only the subject. The constant value V associated to the HasValueNode is providing the object. The HasValueNode simply adds the couple (S,V) to its argument (as an add event coming from the result).

When a tuple is removed from a HasValueNode from the result, the HasValueNode first checks whether the tuple is in its extension. If no, there is nothing more to do. If yes, the removed tuple (S) contains only the subject. The constant value V associated to the HasValueNode is providing the object. The HasValueNode simply removes the couple (S,V) from its argument (as a remove event coming from the result).

HasSelfNode:

When a tuple is added to a HasSelfNode from the result, the HasSelfNode first checks whether the tuple is in its extension. If yes, there is nothing more to do. If no, the added tuple (S) contains only the subject. This subject is also the object. The HasSelfNode simply adds the couple (S,S) to its argument (as an add event coming from the result).

When a tuple is removed from a HasSelfNode from the result, the HasSelfNode first checks whether the tuple is in its extension. If no, there is nothing more to do. If yes, the removed tuple (S) contains only the subject. This subject is also the object. The HasSelfNode simply removes the couple (S,S) from its argument (as a remove event coming from the result).

InverseExpressionNode:

When a couple (S,O) is added to an InverseExpressionNode from the result, the InverseExpressionNode first checks whether the couple is in its extension. If yes, there is nothing more to do. If no, the InverseExpressionNode simply adds the couple to its extension and adds the couple (O,S) to its argument (as an add event coming from the result).

When a couple (S,O) is removed from an InverseExpressionNode from the result, the InverseExpressionNode first checks whether the couple is in its extension. If no, there is nothing more to do. If yes, the InverseExpressionNode simply removes the couple from its extension and removes the couple (S,O) from its argument (as a remove event coming from the result).

ChainNode:

When a couple (S,O) is added to a ChainNode from the result, the ChainNode first checks whether the couple is in its extension. If yes, there is nothing more to do. If no, there is an issue as the ChainNode needs to generate two couples (S,?x) and (?x,O), one for each of the arguments of the ChainNode. The issue is that a valuation for ?x might need to be created in a way that is compliant with the rest of the state of the extended RETE.

This is again a choice point issue that is statically detected at compile time.

When a couple (S,O) is removed from a ChainNode from the result, the ChainNode first checks whether the couple is in its extension. If no, there is nothing more to do. If yes, the ChainNode removes all the couples (S,?x) and (?x,O), respectively from the extension of the first argument node and from the extension of the second argument node, that used to justify (S,O) (as remove events coming from the result).

Summary of Ontology I

The OWL2 axioms are structurally embedded in an extended RETE in very simple way: One OWL2 axiom is compiled to one new extended RETE axiom node. No complex extended RETE pieces involving many nodes are ever built when an OWL2 axiom is compiled. Moreover the axiom nodes can be combined in an arbitrary way as it is the case in OWL2 (The fact that not all the axioms of a T-Box are semantically compliant when combined can be detected when the T-Box alone is designed before the RETE compilation of the T-Box axioms takes place).

The operational semantics of the axiom nodes require backward propagation to be supported by the traditional and the expression RETE nodes. Not all the backward propagation paths are supported. The main issues are related to choice points where new knowledge consistent with the state of the RETE needs to be created to fill unknown assertions (not mentioned in the A-Box). This is the domain of (constraint) logic programming. This tight coupling is dedicated to performance, scalability and safeness, not to full OWL2 expressivity. Hence its role precisely stops where the role of the constraint engine starts: finding the solutions of a constraint system. A mean to statically detect the assertion actions that lead to unsupported backward propagation is provided. In the case where this optional static check is ignored, a runtime error handling mechanism is available to the application that embeds the proposed extended RETE rule engine. The default error handling mechanism provided with the current implementation consists in sending an exception.

This combination of production rule and ontologies is able:

to execute all the highest priority production rule instances that can be valuated with the latest state of the A-Box, to take into account a significant subset of OWL2 reasoning when the conditions of the production rules are valuated. The conditions are valuated equally well with the direct assertions mentioned in the A-Box and with the derived assertions that can be inferred using the supported OWL2 axioms compiled to RETE nodes. Since the OWL2 axioms are embedded in the RETE, OWL2 reasoning becomes stateful and incremental (most OWL2 reasoner implementations are not), to perform A-Box updates as mentioned in the production rule actions in a way that is ultimately logically consistent with the axioms of the T-Box, to fix the inconsistencies that may have been introduced as the A-Box is updated within the production rule engine cycle without stopping it, to provide means for the application to recompose a consistent ontology made of a T-Box (untouched by the production rules) and an A-Box (updated by the production rule actions) that can be further re-used by any other semantic tool that manipulates ontologies.

The strategy for fixing the A-Box inconsistencies is based on the recency principle: the most recent knowledge has to stay in the A-Box, the older knowledge can be removed. This strategy is easy to capture for the author of the production rules since it is already used in a traditional (without expressions and axioms embedding) production rule engine.

Ontology Part II—Processing of Expresssions

OWL2 introduces expressions to build new anonymous classes and properties from existing ones thanks to a set of description logic operators (, sections PropertyExpressions and ClassExpressions). Those expressions are next used as arguments for the OWL2 axiom assertions.

When production rules are tightly coupled to ontologies, the conditions of the production rules are logical formulas. A logical formula is a combination of atomic formulas build thanks to the usual logical connectors (and, or, not). An atomic formula is the application of a predicate to a list of values. In the context of OWL2 ontologies, the values of an atomic formula are constants or variables but not complex terms (as it can be the case in Prolog). And the predicate of an atomic formula can in particular be an OWL2 expression that denotes a class or a property.

For instance, consider a production rule for an application that assigns gifts to persons. In the context of this application, the relevant persons have to be rich or nice customers:

```
production rule giveGift {
    when {
        RichOrNiceCustomer(?c);
        Gift(?g);
    }
    then {
        insert hasGift(?c,?g);
    }
}
```

Written this way, it is necessary to define the concept of "RichOrNiceCustomer" in the ontology before being able to write the rule:

```
class Customer;
class Rich;
class Nice;
class RichOrNiceCustomer == (Rich || Nice) && Customer;
```

This is not convenient since we expect the ontology to contain only long life relevant business concepts and not application specific concepts. Here we are interested in "RichOrNiceCustomer" for one particular application. We would like to build this new concept using ontological constructs but within a rule without having to introduce it for good in the ontology. This is the way to do so with our proposal:

```
production rule giveGift {
    when {
        ((Rich || Nice) && Customer)(?c);
        AvailableGift(?g);
    }
    then {
        insert hasGift(?c,?g);
    }
}
```

Introducing OWL2 fragments such as "(Rich || Nice) && Customer" in predicate position in the formulas in the rule language is not very difficult from a rule language standpoint. But those fragments will need to be properly interpreted at runtime to collect the formula instances that are satisfied with the content of the fact base the production rules are processing.

The embodiments propose a method to embed the OWL2 expressions in a RETE production rule technology. A compilation scheme is proposed to embed OWL2 expressions in what becomes an extended RETE network. An operational semantic is proposed to interpret a RETE network extended to process OWL2 expressions that is fully compliant with the operational semantic used to process the traditional (without OWL2 fragments) production rules on an assertion base. In particular the removal of assertions from the assertion base which is peculiar to production rules when compared to logical rule is properly taken into account even for the embedded OWL2 expressions.

The following example illustrates the capability of the system. In courier type is the actual program. In bold italic are the OWL2 expressions. This example is written in the unified language introduced for the tight coupling between ontologies and rules. A program in this language is compiled to an extended RETE. It shows all the OWL2 expressions that are supported by the system used in predicate positions in atomic formulas of conditions of production rules.

This rule will match any individual who is nice and nasty:

```
production rule intersection_rule {
    when {
        (Nice && Nasty )(?x);
    }
    then {
        doSomething(?x);
    }
}
```

This rule will match any individual who is a cat or a dog:

```
production rule union_rule {
    when {
        (Cat || Dog )(?x);
    }
    then {
        doSomething(?x);
    }
}
```

This rule will match any individual who is a pet but not a cat:

```
production rule difference_rule {
    when {
    (Pet -- Cat )(?x);
    }
    then {
    doSomething(?x);
    }
}
```

This rule will only match the John or Mary individuals:

```
production rule enumeration_rule {
    when {
    (enum{John,Mary} )(?x);
    }
    then {
    doSomething(?x);
    }
}
```

This rule will match any individual who has at least 3 friends who are girls:

```
production rule some_rule {
    when {
    (some(hasFriend,>=3)!Girl )(?x);
    }
    then {
    doSomething(?x);
    }
}
```

This rule will match any individual whose friends are all girls:

```
production rule all_rule {
    when {
    (all(hasFriend)!Girl )(?x);
    }
    then {
    doSomething(?x);
    }
}
```

This rule will match any individual who has Maurice as friend:

```
production rule has_rule {
when {
(has(hasFriend,Maurice) )(?x);
}
then {
doSomething(?x);
}
}
```

This rule will match any individual who is friend with herself/himself:

```
production rule has_self_rule {
when {
(has(hasFriend,self) )(?x);
}
then {
doSomething(?x);
}
}
```

This rule will match any individual ?x who has ?y as a friend:

```
production rule inverse_rule {
when {
(inverse hasFriend )(?y,?x);
}
then {
doSomething(?x,?y);
}
}
```

This rule will match any individual ?x whose brother has ?y has a friend:

```
production rule chain_rule {
when {
(hasBrother.hasFriend )(?x,?y);
}
then {
doSomething(?x,?y);
}
}
```

This rule will match any individual such that her/his brothers have at least 3 friends whose pet animals are all cats or dogs:

```
production rule combination_rule {
when {
(some(hasBrother.hasFriend,>=3)!(all(hasPet)!(Cat||Dog)) )(?x);
}
then {
doSomething(?x);
}
}
```

RETE Network.

The conditions of a set of production rules are compiled to a RETE network. A RETE network is made of nodes that are similar to the relational algebra nodes a database query is compiled to. At compile time, the benefit of the RETE is that similar pieces of conditions are compiled to the same nodes. At runtime, the benefit of the RETE is that 1) duplicate work is saved thanks to the compile time sharing, 2) memories are introduced to avoid computing twice what is already known and to allow the incremental processing of the fact insertions and of the fact removals. Fact events are considered one by one and combined to what is already known in an incremental way.

A condition of a production rule is a formula. When a formula is compiled, a normalization step must first take place on the formula to remove the constants from the atomic formulas with object predicates so that only atomic formulas involving object predicates and variables are compiled to a RETE network. New variables are introduced to replace the constants so as to build a constant free formula. Atomic formulas involving built-in equivalence between the new variables and the original constants are connected to the constant free formula with logical and formulas so that the rewritten formula remains equivalent to the original one. Similarly, when a variable is used more than once in a formula, only one occurrence is kept and new variables are introduced to replace the remaining occurrences. Again, atomic formulas introducing built-in equivalence between the new variables and the now unique original variable are connected to the normalized formula with logical and formulas. For instance the formula "Boy(?b); hasFriend(Maurice,?b)" is rewritten to "Boy(?b); hasFriend(?v1,?v2); =(?v1,Maurice); =(?v2,?b)". The new "?v1" variable is introduced to "remove" the "Maurice" constant. The "?v2" variable is introduced to "remove" the second occurrence of the "?b" variable. Additional "=" atomic formulas are added to the formula with "removed" constants and duplicate variables so as 1) to make it equivalent to the original formula and 2) to put it in a form where it can be compiled to a RETE network.

The nodes of a traditional (not yet extended) RETE network comprise: predicate nodes; filter nodes; product nodes; join nodes; fork nodes; and production nodes.

A predicate node is an input RETE node. It denotes the set of facts that are the instances of a base (named) concept. For instance the atomic formula "Customer(?c)" is compiled to the predicate RETE node that denotes the "Customer" concept. Here this concept is a class, a predicate of arity 1. Predicate nodes can denote predicates of arbitrary arities. There is one predicate node per named predicate in the RETE network. Different atomic formulas involving the same predicate will be compiled to a single predicate node. The predicate node denotes the set of facts that are the instances of the predicate. When the predicate is a class, an instance of a class is a fact that involves a single individual. When the predicate is a property, an instance of a property is a fact that involves a couple of constants. The subject is the first constant and is an individual. The object is the second constant and is a constant (an individual or a data constant). At runtime, as a predicate node is an input node of the RETE network, facts related to the predicate can be added to or removed from the top level and in particular form the action part of the production rules. As facts are added to and removed from the top level, the production rule engine maintains as equivalent the set of facts the predicate node denotes and the set of facts its result node denotes.

A filter node is an intermediate RETE node with a single argument node and a result node. It denotes the subset of the argument facts that satisfy a filter. For instance the atomic formula ">(?x,12)" is compiled to a filter node. The argument of the filter node is the compiled form of a neighbor formula that has generated "?x". The result of the filter node is the compiled form of the remaining neighbor formulas that depend on "?x". Filter nodes with the same argument and the same filter are merged during the RETE compilation. A filter node can denote a set of facts of arbitrary arity (not necessarily 1). A filter is introduced when all the values for the variables its formula uses can be found in the same argument fact. At runtime, as facts are added to and removed from the argument, the production rule engine updates the set of facts that satisfy the filter. It also maintains as equivalent the set of facts the filter node denotes and the set of facts its result node denotes.

A product node is an intermediate RETE node with two arguments and a result node. It denotes the unconditional product between the facts of the first argument and the facts of the second argument. A product node is the compiled form of formulas unconditionally connected with a logical and. For instance the and formula "Customer(?c); Gift(?g)" is compiled to a product node which first argument is the "Customer" predicate node and second argument is the "Gift" predicate node. The facts associated to this product node are couples of the form (?c,?g). Product nodes can be introduced at any intermediate level in the RETE network. A product node may well have the same first and second arguments. Product nodes with the same arguments are merged during the RETE compilation. At runtime, as facts are added and removed randomly to/from either the first or the second argument, the production rule engine updates the set of product facts. It also maintains as equivalent the set of product facts the product node denotes and the set of facts its result node denotes.

A join node is an intermediate RETE node with two arguments and a result node. It denotes the conditional product between the facts of the first argument and the facts of the second argument. The join condition is a filter syntactically similar to the filter of a filter node. The peculiarity of the filter of a join node is that it involves variables coming from each of the two arguments. A join node is the compiled form of formulas connected with a logical and involving a filter. For instance the and formula "age(?p1,?a1); age(?p2,?a2); >(?a1,?a2)". is compiled to a join node which first and second argument is the "age" predicate node and the filter is ">(?a1,?a2)". The facts associated to this join node are tuples of the form (?p1,?a1, ?p2,?a2). A join node is semantically equivalent to a product node which result is a filter node. But the join node is more efficient. The filter is taken into account as the products are built instead of having to build all the products before applying the filter. Join nodes can be introduced at any intermediate level in the RETE network. Join nodes with the same arguments and the same filters are merged during the RETE compilation. At runtime, as facts are added and removed randomly to/from either the first or the second argument, the production rule engine updates the set of product facts that satisfy the join filter. It also maintains as equivalent the set of filtered product facts the join node denotes and the set of facts its result node denotes.

A fork node is an intermediate RETE node with one argument and many result nodes. It is there to be able to connect many result nodes to the same argument node. For instance the two formulas "Man(?m); Car(?c)" and "Man (?m); Bike(?b)" are compiled to two product nodes which first arguments are the same fork node. The argument of the fork node is the "Man" predicate node. The second argument of the first product node is the "Car" predicate node. The second argument of the second product node is the "Bike" predicate node. The arguments and the result must be all of the same arity. At runtime, as facts are added and removed to/from the argument, the production rule engine maintains as equivalent the set of facts the argument node of the fork node denotes and the sets of facts the result nodes of the fork node denote.

A production rule node is an output RETE node with one argument node and the compiled form of the scripting statements of the action part. For instance the production rule "when {Customer(?c); Gift(?g);} then {action(?c,?g);}" is compiled to a production rule node which argument is the compiled form of the condition "Customer(?c); Gift(?g)" as described above and which action is the compiled form of the action part "action(?c,?g);". At runtime, as facts are added and removed to/from the argument, the production rule engine updates the set of production rule instances that satisfy the condition (argument node). More precisely there is one production rule instance created for each fact of the set of facts the argument node denotes. This is the way fact based production rules yet without OWL2 expressions are compiled to a RETE network and then interpreted.

The embodiments provide a method that extends the traditional RETE network and its interpretation by a RETE based production rule engine to natively process OWL2 expressions. The compilation scheme of OWL2 expressions to extended RETE nodes is facilitated by the fact that we introduce a single new RETE node for each of the individual OWL2 expression construct. The new extended RETE nodes are fully compliant with the traditional RETE nodes.

OWL2 expressions are either class expressions: expressions that denote classes, or either property expressions: expressions that denote properties, or even data range expressions: expressions that denote complex types for data constants. The data range expressions are systematically compiled to filter formulas. Filter and join nodes that deal with filter formulas are already parts of the traditional RETE nodes. Hence, the proposed method is dedicated to the OWL2 object expressions: class or property expressions that are dedicated to at least one individual.

OWL2 Class Expressions.

The most basic OWL2 class expression is a reference to a base named class. A class is a predicate of arity one. Such an OWL2 class expression is simply compiled to a predicate node which is already available in the traditional fact based RETE described in the prerequisites.

The intersection of two OWL2 class expressions is an OWL2 class expression. An intersection node is a new intermediate RETE node with two argument nodes and a result node. It denotes the set that is the intersection of the facts of the first argument and of the facts of the second argument. For instance the atomic formula "(Nice && Nasty)(?g)" is compiled to an intersection node which first argument is the "Nice" predicate node and the second argument is the "Nasty" predicate node. Intersection nodes can be introduced at any intermediate level in the RETE network provided their arguments have the same arity. The arity of the result is the equivalent arity of the arguments. An intersection node may well have the same first and second arguments. Intersection nodes with the same arguments are merged during the RETE compilation. At runtime, as facts are added and removed randomly to/from either the first or the second argument, the production rule engine updates the intersection of the sets of facts the arguments denote. It also maintains as equivalent this intersection and the set of facts the result node denotes.

The union of two OWL2 class expressions is an OWL2 class expression. A union node is a new intermediate RETE node with two argument nodes and a result node. It denotes the set that is the union of the facts of the first argument and of the facts of the second argument. For instance the atomic formula "(Cat || Dog)(?p)" is compiled to a union node which first argument is the "Cat" predicate node and the second argument is the "Dog" predicate node. Union nodes can be introduced at any intermediate level in the RETE network provided their arguments have the same arity. The arity of the result is the equivalent arity of the arguments. A union node may well have the same first and second arguments. Union nodes with the same arguments are merged during the RETE compilation. At runtime, as facts are added and removed randomly to/from either the first or the second argument, the production rule engine updates the union of the sets of facts the arguments denote. It also maintains as equivalent this union and the set of facts the result node denotes.

The complement of an OWL2 class expression is an OWL2 class expression. In a RETE where sets of known facts are represented as extensions, the interpretation is performed under the closed world assumption: a fact that is not in an extension is considered a failure. The semantics of OWL2 is based on the open world assumption: a fact that is not known is not necessarily a failure. It may be a success or a failure, additional knowledge is required to take the right decision.

In the case of the closed world assumption, the complement of a class has to be computed relatively to a world class which is not necessarily the top (most general) class. A difference node is a new intermediate RETE node with two argument nodes and a result node. The first argument denotes the world. The second argument denotes the set of facts to be complemented. The result node denotes the world minus the set of facts that are complemented (first minus second). For instance the atomic formula "(Pet--Cat)(?p)" is compiled to a difference node which first argument is the "Pet" predicate node and the second argument is the "Cat" predicate node. Difference nodes can be introduced at any intermediate level in the RETE network provided their arguments have the same arity. The arity of the result is the equivalent arity of the arguments. A difference node may well have the same first and second arguments even if such a node will always denote the empty set of facts. Difference nodes with the same arguments are merged during the RETE compilation. At runtime, as facts are added and removed randomly to/from either the first or the second argument, the production rule engine updates the difference between the of the set of facts the first argument (world) denotes and the set of facts the second argument (complemented) denotes. It also maintains as equivalent this difference and the set of facts the result node denotes.

An enumeration of individuals is an OWL2 class expression. A nameless class is defined by extension. All the individuals who are members of this class are listed. An enumeration node is a new input RETE node with a result node. It denotes the set of individuals that are listed. For instance the atomic formula "enum{John,Mary}(?p)" is compiled to an enumeration node which set of individuals is "{John,Mary}". Enumeration nodes with the same listed individuals are merged during the RETE compilation. At runtime, the production rule engine maintains as equivalent the sets of facts the enumeration node denotes and the set of facts its result node denotes. There is no mean to add or remove facts to/from an enumeration.

The class of the subject individuals such that there exist some object constants (individuals or data constants) related to a subject individual thanks to a property expression that are instances of a class expression or a data range expression is an OWL2 class expression. A distinction is made here according to the kind of property expression involved to relate the subjects and the objects:

When the property expression denotes an object property (the objects are individuals, not data constants), such an OWL2 class expression is compiled to a "some" node. A "some" node is a new intermediate RETE node with two argument nodes, a cardinality restriction and a result node. The first argument node denotes the object property expression, a set of couple facts of the form (subject,object). The second argument node denotes the class expression the objects related to a subject must be instances of. The cardinality restriction specifies how many objects are expected to be related to a subject. For instance the atomic formula "(some(hasFriend,>=3)!Girl)(?p)" denotes the set of the individuals who have at least 3 friends who are girls. It is compiled to a "some" node which first argument is the "hasFriend" (object property) predicate node, which second argument is the "Girl" (class) predicate node and which cardinality restriction is ">=3" (at least 3). "Some" nodes can be introduced at any intermediate level in the RETE network. "Some" nodes with the same arguments and cardinality restriction are merged during the RETE compilation. At runtime, as facts are added and removed randomly to/from either the first or the second argument, the production rule engine updates the sets of facts the "some" node denotes. It also maintains as equivalent this set of facts and the set of facts the result node denotes. The facts of a "some" node are class facts with each a single individual. Such a single individual is a subject individual of the facts of the first argument (which denotes an object property expression).

When the property expression denotes a data property (the objects are data constants, not individuals), such an OWL2 class expression is compiled to a "some formula" node. A "some formula" node is a new intermediate RETE node with one argument node, a data range restriction, a cardinality restriction and a result node. The argument node denotes the data property expression, a set of couple facts of the form (subject,object). The data range restriction is a formula. The related objects must be instances of the data range. The cardinality restriction specifies how many objects are expected to be related to a subject. For instance the atomic formula "(some(hasNickName,>=3)!string)(?p)" denotes the set of the individuals who have at least 3 nicknames which are string data constants. It is compiled to a "some formula" node which argument is the "hasNickName" (data property) predicate node, which data range restriction is the "string(?x)" formula and which cardinality restriction is ">=3" (at least 3). "Some formula" nodes can be introduced at any intermediate level in the RETE network. "Some formula" nodes with the same argument, data range restriction and cardinality restriction are merged during the RETE compilation. At runtime, as facts are added to and removed from the argument, the production rule engine updates the sets of facts the "some formula" node denotes. It also maintains as equivalent this set of facts and the set of facts the result node denotes. The facts of a "some formula" node are class facts with each a single individual. Such a single individual is a subject individual of the facts of the argument (which denotes a data property expression).

All the different OWL2 cardinality restrictions are supported: min-cardinality (for instance ">=3"), max-cardinality (for instance "<=3") and exact-cardinality (for instance "=3"). The class of the subject individuals, such that all the object constants (individuals or data constants), that are related to a subject individual thanks to a property expression, are instances of a class expression or a data range expression is an OWL2 class expression. A distinction is made here according to the kind of property expression involved to relate the subjects and the objects:

When the property expression denotes an object property (the objects are individuals, not data constants), such an OWL2 class expression is compiled to an "all" node. An "all" node is a new intermediate RETE node with two argument nodes and a result node. The first argument node denotes the object property expression, a set of couple facts of the form (subject,object). The second argument node denotes the class expression the objects related to a subject must be instances of. For instance the atomic formula "(all (hasFriend)!Girl)(?p)" denotes the set of the individuals whose friends are all girls. It is compiled to a "some" node which first argument is the "hasFriend" (object property) predicate node and which second argument is the "Girl" (class) predicate node. "All" nodes can be introduced at any intermediate level in the RETE network. "All" nodes with the same arguments are merged during the RETE compilation. At runtime, as facts are added and removed randomly to/from either the first or the second argument, the production rule engine updates the sets of facts the "all" node denotes. It also maintains as equivalent this set of facts and the set of facts the result node denotes. The facts of an "all" node are class facts with each a single individual. Such a single individual is a subject individual of the facts of the first argument (which denotes an object property expression).

When the property expression denotes a data property (the object are data constants, not individuals), such an OWL2 class expression is compiled to an "all formula" node. An "all formula" node is a new intermediate RETE node with one argument node, a data range restriction and a result node. The argument node denotes the data property expression, a set of couple facts of the form (subject,object). The data range restriction is a formula. The related objects must be instances of the data range. For instance the atomic formula "(all (hasNickName)!string!(length >=4))(?p)" denotes the set of the individuals whose nicknames are all string data constants of a length which is at least 4. It is compiled to an "all formula" node which argument is the "hasNickName" (data property) predicate node and which data range restriction is the "(string!(length >=4))(?x)" formula. "All formula" nodes can be introduced at any intermediate level in the RETE network. "All formula" nodes with the same argument and data range restriction are merged during the RETE compilation. At runtime, as facts are added to and removed from the argument, the production rule engine updates the sets of facts the "all formula" node denotes. It also maintains as equivalent this set of facts and the set of facts the result node denotes. The facts of an "all formula" node are class facts with each a single individual. Such a single individual is a subject individual of the facts of the argument (which denotes a data property expression).

The class of the subject individuals such that one of the object constants (individuals or data constants) related to this subject individual thanks to a property expression is equivalent to a given constant (individual or data constant) is an OWL2 class expression. Such an OWL2 class expression is compiled to a "hasValue" node. A "hasValue" node is a new intermediate RETE node with an argument node, a given constant and a result node. The argument node denotes the property expression, a set of couple facts of the form (subject,object). The constant is the constant at least one of the objects related to a subject is expected to be equivalent to. For instance the atomic formula "(has(hasFriend,Maurice))(?p)" denotes the set of the individuals who have "Maurice" as a friend. It is compiled to a "hasValue" node which argument is the "hasFriend" (object property) predicate node and which constant is "Maurice". "hasValue" nodes can be introduced at any intermediate level in the RETE network. "hasValue" nodes with the same arguments and the same constants are merged during the RETE compilation. At runtime, as facts are added to and removed from the argument, the production rule engine updates the set of facts the "hasValue" node denotes. It also maintains as equivalent this set of facts and the set of facts the result node denotes. The facts of a "hasValue" node are class facts with each a single individual. Such a single individual is a subject individual of the facts of the argument (which denotes a property expression).

The class of the subject individuals such that one of the object individuals related to this subject individual thanks to an object property expression is equivalent to the subject individual is an OWL2 class expression. Such an OWL2 class expression is compiled to a "hasSelf" node. The "hasSelf" node is similar to the "hasValue" node. The difference is that the "hasSelf" node does not need a constant to be specified since the constant is expected to be the subject itself. For any fact of the set of facts the argument node denotes, the equivalence is between the object and the subject, not between the object and the given constant.

OWL2 Property Expressions.

The most basic OWL2 property expression is a reference to a base named property. A property is a predicate of arity 2. Such an OWL2 property expression is simply compiled to a predicate node which is already available in the traditional (fact based) RETE described in the prerequisites.

The inverse of an OWL2 property expression is an OWL2 property expression. An inverse OWL2 property expression is compiled to an inverse node. An inverse property node is a new intermediate node with an argument node and a result node. The argument node denotes the property expression to reverse. For instance the atomic formula "(inverse hasFriend)(?subject,?object)" is compiled to an inverse property node which argument node is the "hasFriend" (property) predicate node. Inverse property nodes can be introduced at any intermediate level in the RETE network. Inverse nodes with the same arguments are merged during the RETE compilation. At runtime, as facts are added to and removed from the argument, the production rule engine updates the set of facts the inverse property node denotes. It also maintains as equivalent this set of facts and the set of facts the result node denotes. The facts of an inverse property node are property facts of the form (?object, ?subject). Those facts are simply reversed when compared to the facts of the argument node which are of the form (?subject,?object).

The chain of two OWL2 property expressions is an OWL2 property expression. A chain of two OWL2 property expressions is compiled to a chain node. A chain node is a new intermediate node with two argument nodes and a result node. The first argument node denotes the first property expression to consider in sequence. The second argument node denotes the second property expression of the sequence. For instance the atomic formula "(hasBrother.hasFriend)(?p,?q)" is compiled to a chain node which first argument node is the "hasBrother" (property) predicate node and which second argument node is the "hasFriend" (property) predicate node. Chain nodes can be introduced at any intermediate level in the RETE network. Chain nodes with the same arguments are merged during the RETE compilation. At runtime, as facts are added and removed randomly to/from either the first or the second argument, the production rule engine updates the set of facts the chain node denotes. It also maintains as equivalent this set of facts and the set of facts the result node denotes. The facts of a chain node are property facts of the form (?subject, ?object). It means that there exist at least one individual ?x such that the fact (?subject,?x) is in the set of facts the first argument denotes and the fact (?x,?object) is in the set of facts the second argument denotes.

OWL2 class expressions and property expressions can be recursively combined to build more complex OWL2 class expressions. The compiled forms of the OWL2 expressions are extended RETE nodes as described above. Those nodes are recursively connected in the RETE network in a way that reflects the original structure of the OWL2 expressions. OWL2 expressions are tree shaped expressions. In computer science, expressions are usually graphically represented with the root (top combining expression) at the top and the leaves (base named predicated or enumerations) at the bottom. The corresponding extended RETE network will have a similar tree shape. But the leaves will be at the top as input nodes and the root at the bottom. Moreover, common sub-expressions will be compiled to the same RETE nodes.

OWL2 property expressions can be recursively combined to build more complex OWL2 property expressions in a similar way.

Ontology Part III—Unified Language for Rules, Actions and Ontologies—Tight Programming Language A further aspect to the embodiments is a unified language for rules, actions and ontologies. The embodments address issues in the area of business rules management systems, semantic web technologies (such as OWL and RIF), and more generally the area of human readable languages used to express rules and ontologies. The embodiments propose a single unified language to express rules and ontologies in the same place.

Business rules management systems involve the concept of elementary rules that describe logical relations and/or consequence of logical relations on the real world and information systems. The business rules are written on a business vocabulary. The business vocabulary isolates the key concepts of a particular business. The business vocabulary is evolving less frequently than the business rules. The purpose of an ontology is to provide means to describe and to reason on the concepts of the vocabulary outside of the rules.

For instance, using a BRMS, a banker can create a vocabulary:
  A Customer has an Account
  An Account has a balance which is an integer
And then write rules grounded on this vocabulary:
  If the balance of the account of the customer is the greatest among all the balances of the accounts of the customers then the customer is the Richest'.
  If the balance of the account of the customer is the greatest among all the balances of the accounts of the customers then send a congratulation mail.

The first rule is a logical rule. It is defining the concept of "Richest" in a logical way. The second rule is a production rule. It is triggering an action (send a mail) when the condition is met.

The conditions of the two rules are the same. First, it would be interesting to be able to reuse the concept of "Richest" to simplify the condition of the production rule:
  If the customer is the Richest' then send a congratulation mail.

Second, it seems that the concept of "Richest" is an important business concept since it is mentioned in several rules. It should be interesting to define it at the ontology level.
  The Richest' is the Customer whose balance of account is the greatest among all the balances of the accounts of the customers.

Currently the ontology (vocabulary) and the rules are expressed with totally different languages. There is no mean to define important business concepts with logical rules beyond the level of logic the ontology is supporting. For instance, here, comparing the balances two by two until the greatest one is found requires a join between two variables (one variable for each balance considered at one point in time). This is beyond the expressivity of an OWL2 ontology that can only define derived concepts with restrictions based on a single variable (starting from the current subject, here the customer) and constants, but no additional variables. There is also no mean to consider logical rules and production rules in the same place. A BRMS is mostly dedicated to one sort of rule: logical or production, but not both. This is frustrating since the condition part of a production rule is similar to the premise of a logical rule.

Relying on different languages prevent from introducing a simple syntax that would facilitate the authoring and the maintenance of the vocabularies and the rules. Moreover it prevents the introduction of a unified semantic that will best fit the requirements of both the vocabularies and the rules (logical rules and production rules). Business users do not understand the technical differences between logical descriptions, logical rules and production rule conditions. And they are pretty right, all this is mostly the same.

As a consequence, BRMS systems need to provide a single unified language to give the business people a mean to freely express business vocabularies and rules outside of technical considerations.

Related art for languages comprises Semantics of Business Vocabulary and Business Rules (SBVR), a standard language to express business vocabularies and rules. Vocabularies correspond to ontologies. SBVR is introducing a high-level logic based language for this purpose. The rules of SBVR are mostly logical rules but there are also action rules that correspond to production rules. It introduces a mean to express vocabularies and rules in controlled natural language. The first level of such a controlled natural language is called "Structured English". SBVR is providing a language dedicated to the business users. SBVR is not expected to be directly executed mainly because no system existed to provide the executable support. The processing of business ontologies and rules require executable ontologies and rules. A translation has to be performed from the business language to an executable language.

Standard OWL2 ontologies are expressed with an XML language that is not intended to be read by human even if experts of this field can definitely manually build an ontology with this language. This XML language is executable and is used as an interchange format to exchange executable ontology specifications from one application to an other. GUI based authoring tools are available to build ontologies. They provide a mean to export an ontology using the standard XML language. The most popular of those is Protégé.

Going back to SBVR, the translation from SBVR to OWL2 is partial. The expressivity of SBVR is greater than the expressivity of OWL2. The full translation of SBVR to executable ontologies and rules is complex because since no single executable environment exists, the translation needs to create more than one executable artifacts that will be processed by different executable environments. Typically the SBVR part that correspond to an OWL2 ontology will be translated to an OWL2 ontology and the SBVR part that correspond to rules will be translated to executable rules grounded on the OWL2 ontology. Synchronizing different executable environments at runtime so that the initial business semantics is properly implemented is a challenge.

Production Rules are currently mostly expressed with proprietary languages. For instance, IBM Business Rules Management System (BRMS) introduces a business language to express an object model and a business language to express decision artifacts (decision tables) and production rules. IBM is trademark of International Business Machines in the US and other countries. The business object model, the business decision artifacts and the business production rules are translated to their executable counterparts for execution purpose. BRMS also provides executable (also called technical) languages for the executable object model and the executable production rules. The business decision artifacts are silently translated to executable production rules. Many different languages are involved here. The complexity related to their integration is hidden thanks to GUI based business interfaces. A first remark is that the production rules are grounded on an object model. An object model is a very particular case of an OWL2 ontology. The expressivity of an OWL2 ontology is greater than the expressivity of an object model. When an OWL2 ontology needs to be used, it is translated to an object model. This translation is partial. The object model, the decision artifacts and the production rules are not compliant with logic. In particular the production rules are matching terms (objects) and not facts. Their conditions are one way patterns dedicated to term (object) matching and not two ways logical formulas dedicated to facts.

The emerging standard language to exchange executable rules is RIF (Rule Interchange Format). This is an XML language. This standard is interesting because it aims at reconciling logical rules and production rules. But it is a bit frustrating because even if few commonalities between logical rules and production rules are isolated in a common layer called "core", the two sorts of rules are still considered different. The logical rules of RIF are very much compliant with logic engines. But the production rules of RIF are mostly compliant with the available commercial offerings whose languages have inspired this part of RIF. The production rules of RIF are too much dedicated to objects and too few related to logic. Ontologies are not part of RIF. Available ontologies can only be imported to be used in RIF rules.

A problem with current approaches of language is that they rely on different languages to express rules and ontologies. On the one hand, ontologies are introducing base (named) concepts. But there is no mean to define a base concept thanks to a complex logical rule. On the other hand, rules are grounded on the base concepts but cannot combine them using the operators and the connectors available in the ontology logic. Moreover production rules and logical rules are expressed with different languages even if much commonalities exist between the two.

The solution of the embodiments is a unified executable language with a human readable syntax and semantics to describe vocabularies and rules in the same place. A convenient concrete syntax to express OWL2 ontologies is introduced. A method of defining ontology concepts with complex logical rules. Logical rules conditions and production rules conditions are defined as totally similar logical formulas. Mechanisms for the rules to benefit from the ontological expressions available to build new unnamed concepts from the base ones are introduced.

The following example illustrates the capability of the system. In courier type is the actual program. // marks comments. This example demonstrates the expressiveness of the unified language. The initial version of the use case used above is implemented to describe the problem:

```
// This use case is about customers and their accounts:
class Customer; class Account; property hasAccount {
   domain Customer;  // a customer functional;    // has one range
   Account;    // account
};
property hasBalance {
   domain Account;  // an account
   functional;   // has one
   range integer; // balance which is an integer
};
A logical rule tells how to identify the 'Richest':
logical rule {
   when {
hasAccount(?c,?a);   // the customer has account hasBalance(?a,?b);
// the account
has a balance hasBalance(?a2,?b2);  // when compared to all the balances
      >=(?b,?b2);     // this balance is the greatest
   }
   then {
      Richest(?c);  // the customer is the 'Richest'
   }
}
A production rule sends a congratulation mail to the 'Richest':
production rule SendMail2Richest {
   when {
   // the same condition as above
hasAccount(?c,?a);
hasBalance(?a,?b);
hasBalance(?a2,?b2);
>(?b,?b2);
}
then {
   sendCongratulationMail(?c);
}
}
```

This use case is implemented below to point out the benefits of the unified language:

```
// This use case is about customers and their accounts:
class Richest;  // the concept of 'Richest' can be named but not defined
with the limited OWL2 description logic, it will be defined below with a
logical rule
class Customer;
class Account;
property
hasAccount {
   domain Customer;
functional;
range Account;
};
property
hasBalance
{ domain
Account;
functional;
range integer;
};
// A logical rule now defines the 'Richest' concept with a premise whose
complexity is too great to be defined with OWL2 constructs:
logical rule {
when {
hasAccount(?c,?a);
hasBalance(?a,?b);
hasBalance(?a2,?b2);
>(?b,?b2);   // join between 2 variables
}
```

```
-continued then {
Richest(?c);   // this defines the 'Richest' concept
}
}
```

The production rule can use the 'Richest' concept in its condition:

```
production rule SendMail2Richest {
when {
    Richest(?c);
}
then {
    sendCongratulationMail(?c);
}
}
```

This language unifies ontologies with rules and actions. Ontologies are defined with the (org/TR/owl-overview/). Production rules are matching facts and not terms (objects) so as to become compliant with the logical rules and the ontological descriptions.

A unified executable language is proposed with a human readable syntax and a semantics to express vocabularies and rules:

The vocabulary is defined as an ontology. All the OWL2 constructs to build expressions and axioms are available in our language. A convenient concrete syntax is provided instead of the hard to manipulate OWL2 XML syntax.

OWL2 expressions are tree-like expressions that denote classes or properties. A class is a predicate of arity 1. A property is a predicate of arity 2. The basic classes or properties (simply introduced as names, for instance: "Customer", "hasAccount") are at the leaves. The nodes of the tree expression are connecting sub-expressions thanks to a set of description logic connectors (for instance one can build the intersection or the union of two classes as an expression). But our language does not restrict the expressions to class or property expressions as it is the case in OWL2. The expressions are generalized to predicate expressions of arity greater than 2, provided the arities of the sub-expressions are compatible (for instance, it is an error to build the union of a class and of a property).

OWL2 axioms are describing fundamental relations between class or property expressions. For instance one can state that the class "Customer" is equivalent to the class "Client" (French translation for "Customer") or that the class "GoodCustomer" is a subclass of "Customer" or even that the class "BadCustomer" is disjoint from the class "GoodCustomer".

Logical rules are available. A logical rule is connecting a premise and a conclusion. The premise is a logical formula. A logical formula is a combination of atomic formulas using the usual logical connectives (and, or, not). An atomic formula is the application of a predicate expression as described above to values. The rules can freely introduce predicate expressions in predicate position in the formulas without the need to introduce them beforehand with names at the ontology level as it is the case today. The values used in atomic formulas are constants or variables. Complex terms (as in Prolog) are not allowed as values as this is not part of the standard OWL2 runtime model we expect to be compliant with. A variable can be used more than once in a premise formula. Equivalences are automatically introduced. A conclusion is currently restricted to an atomic formula whose predicate expression is a named predicate and whose applied values are only variables that must be all different. The variables of the conclusion must be bound in the premise so that the effective values they denote are never undefined at runtime. Logical rules here are used to define predicates (classes or properties in particular). This restricted usage can be relaxed in future versions of our language so as to be able specify axioms with logical rules.

A logical rule can be used to define a base concept of the ontology that is only known so far as a name. This is useful when the concept requires a definition that goes beyond the expressivity of the ontology logic. For instance, the concept of "Richest" can be defined thanks to a logical rule but cannot be defined with description logic at the ontology level.

Production rules are available. A production rule has a condition and an action. The condition is a logical formula absolutely similar to the premise of a logical rule. It means that the production rules are going to match facts and not simply terms (objects) as it is the case today. A fact is an instance of a predicate. It is a couple made of the predicate identifier and a list of values. The action is a piece of simple script which nevertheless contains dedicated instructions to specify the assertion or the removal of facts to/from the assertion base the production rules will be processing at runtime.

The language comprises the following components: compilation unit declarations; built-in functions; axioms; expressions; a cardinality restriction; object types; data types; formulas; terms; actions; and advanced constraints.

FIGS. 6A, 6B and 6C show tables with descriptions and examples of compilation units declarations A, B and C respectively.

FIG. 6D shows a table with descriptions and examples of built-in functions.

FIGS. 6E and 6F show tables with descriptions and examples of axioms A and B respectively.

FIGS. 6G, 6H and 6I show tables with descriptions and examples of expressions including classes, properties and predicates.

FIG. 6I also shows a table with a description and example of a cardinality restriction.

FIG. 6J show tables with descriptions and examples of data types.

FIG. 6K shows a table with descriptions and examples of object types.

FIGS. 6L and 6M show tables with descriptions and examples of formulae.

FIGS. 6N and 6O show tables with descriptions and examples of terms.

FIGS. 6P and 6Q show tables with descriptions and examples of actions.

FIG. 6R shows a table with description and example of an advanced constraint.

Further embodiments of the invention are now described.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

Thus, as described herein, in a first aspect of the invention there is provided a production rules engine comprising: a class loader for loading production rule ontology into a rule engine; a class loader for loading production rules into the rule engine whereby a production rule comprises a rule and an action defined in the production rule ontology; creating instances of the productions rules; a reasoner for executing the production rules and for locating an instance of a production rule having an inconsistency between an action to change the ontology and the existing ontology and for executing the production rules after inconsistencies have been fixed; a constraint engine for locating a solution to the inconsistent ontology; and a fixer for updating the ontology with the located solution.

In summary a method is presented to embed the OWL2 axioms in a RETE production rule ontology. A compilation scheme is proposed to embed the OWL2 axioms in what becomes an extended RETE network. An operational semantic is proposed to interpret a RETE network extended to process OWL2 axioms that is fully compliant with the operational semantic used to process the traditional (without OWL2 axioms) production rules on an assertion base. In particular the removal of assertions from the assertion base which is peculiar to production rules when compared to logical rules is properly taken into account even for the embedded OWL2 axioms. It is proposed to incrementally and automatically fix an inconsistency in the case it is introduced at runtime using a strategy which is based on the recency principle (highest priority to most recently valuated highest priority rule instance) of the traditional (without OWL2 axioms) production rules. It is proposed to statically detect all the assertion actions that lead to a limitation of the extended production rule engine combination.

Preferably the constraint engine generates more than one logical solution to the inconsistency and chooses a logical solution to use.

More preferably the ontology and assertions are loaded into data structure comprising a logical network of nodes.

Most preferably the logical network of nodes is a RETE network and the reasoning using a RETE algorithm.

Even more preferably the production rules assertions are executed in order of priority and logical inconsistencies are located in a rule by rule basis.

Still more preferably, at runtime, logical nodes are associated with local memory made of tuples whereby each tuple represents the arguments of a fact. For instance, the tuple (marie) in the instances of Person denotes the fact Person (marie)).

In a loose coupling between production rules and ontologies, the OWL2 fragments are interpreted by an external reasoner outside of the production rule engine. The production rule engine is the master engine. But it only takes care of the production rules. It delegates the ontological processing to the reasoner. OWL2 reasoners are not necessarily ready to interpret new OWL2 expressions that are not already part of the ontology they are processing. Sometimes it is necessary to silently introduce the OWL2 expressions the rules require in an extension of the original ontology so that the external reasoner can properly compile them and then interpret them. As logic components, OWL2 reasoners are only answering deductive queries on the fact base. For instance an OWL2 reasoner can tell which individuals are instances of an OWL2 class expression. OWL2 expressions are in fact queries. But production rules are modifying the fact base as they are processing it thanks to fact insertion and fact removal actions. An OWL2 reasoner is not able to react incrementally to those fact base changes as a production rule technology can. An OWL2 reasoner will compute the result of a deductive query, such as an OWL2 expression, from scratch, each time it is asked to. There is a significant benefit in extending the production rule technology to process OWL2 expressions in an incremental way and reconsider the answer to a query only if it is really impacted by a change in the fact base.

The embodiments provide a tight coupling between ontologies and production rules where the processing of the ontological constructs is performed by a single engine built as an extended production rule technology.

The OWL2 expressions in the predicate position of the atomic formulas need to be compiled as the conditions of the production rules which are formulas are compiled. Next, at runtime, the compiled forms of the OWL2 expressions need to be interpreted as the compiled form of the conditions are interpreted by the production rule engine.

The conditions of the production rules are compiled to a RETE network. Since OWL2 expressions are now deeply embedded in the conditions as fragments, the RETE network needs to be extended to support OWL2 expressions in a native way.

According to a second aspect of the invention there is provided a method for operating a production rule engine comprising: loading production rule ontology into a production rule engine; loading production rules into the production rule engine whereby a production rule comprises a rule and an action defined using the production rule ontology; executing the production rules; locating a logical inconsistency between ontology changed by a respective action and the existing ontology; locating a logical solution to the inconsistent ontology; and updating the ontology with the located logical solution.

In a third aspect of the invention there is provided a computer program product for a production rules engine, the computer program product comprising a computer-readable storage medium having computer-readable program code embodied therewith and the computer-readable program code configured to perform the method of any one of the method claims.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques.

The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing any of the method claims.

In a fifth aspect of the invention there is provided a data carrier aspect of the preferred embodiment that comprises functional computer data structures to, when loaded into a computer system and operated upon thereby, enable said computer system to perform all the steps of the method. A suitable data-carrier could be a solid-state memory, magnetic drive or optical disk. Channels for the transmission of data may likewise comprise storage media of all descriptions as well as signal-carrying media, such as wired or wireless signal-carrying media.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear to one skilled in the art that many improvements and modifications can be made to the foregoing exemplary embodiment without departing from the scope of the present invention.

What is claimed is:

1. A production rules engine comprising:
   a class loader configured to load a production rule ontology into a rules engine, wherein the production rule ontology provides a description and instances of a production rule, wherein the production rule comprises a condition part and an action part, wherein the condition part matches instances of the production rule to be grouped into a working memory, and wherein the action part updates the instances of the production rule in response to the instances of the production rule being grouped into the working memory;
   a class loader configured to load production rules into the rules engine, wherein the production rule comprises a rule and an action defined in the production rule ontology;
   a production instance creator configured to create instances of the production rules;
   a reasoner configured to:
      execute the production rules,
      locate an instance of a production rule having an inconsistency between an action to change the production rule ontology and an existing ontology, and
      execute the production rules after production rule inconsistencies have been fixed;
   a constraint engine configured to locate a solution to an inconsistent ontology;
   a fixer configured to update the inconsistent ontology with a located solution; and
   an ontology manager configured to:
      embed an Ontological Web Language (OWL) axiom in a single extended RETE axiom node, wherein the OWL axiom is a class expression, and wherein the single extended RETE axiom node is a stateless RETE subnode that has no local memory associated to it;
      embedding embed the OWL axiom into a RETE production rule engine; and
      define new language terms based on tight coupling between the RETE production rule engine and the OWL axiom.

2. The production rules engine according to claim 1, wherein the constraint engine generates more than one logical solution to the inconsistent ontology, and wherein the constraint engine chooses a logical solution to use when generating said more than one logical solution to the inconsistent ontology.

3. The production rules engine according to claim 1, wherein ontologies and assertions are loaded into a data structure comprising a logical network of nodes.

4. The production rules engine according to claim 3, wherein the logical network of nodes is a RETE network that utilizes a RETE algorithm.

5. The production rules engine according to claim 4, wherein at runtime, logical nodes, within the logical network of nodes, are associated with local memory made up of tuples, wherein each tuple represents arguments of a fact asserted in the RETE algorithm.

6. The production rules engine according to claim 1, wherein production rules assertions are executed in order of priority, and wherein logical inconsistencies to ontologies are located in a rule by rule basis.

7. The production rules engine of claim 1, wherein the production rules engine is a master engine that only takes care of the production rules.

8. The production rules engine of claim 1, wherein the reasoner is an Ontological Web Language (OWL) reasoner that answers queries on the production rule ontology, and wherein the production rule ontology is part of a RETE production rule technology running in a RETE network.

9. A computer program product for operating a production rule engine, the computer program product comprising a non-transitory computer readable storage medium having program code embodied therewith, the program code readable and executable by a processor to perform a method comprising:
   loading a production rule ontology into a production rule engine, wherein the production rule ontology provides a description and instances of a production rule, wherein the production rule comprises a condition part and an action part, wherein the condition part matches instances of the production rule to be grouped into a working memory, and wherein the action part updates the instances of the production rule in response to the instances being grouped into the working memory;
   loading production rules into the production rule engine, wherein the production rule comprises a rule and an action defined by use of the production rule ontology;
   executing, by one or more processors, the production rules;
   locating a logical inconsistency between an ontology changed by a respective action defined by use of the production rule ontology and an existing ontology;
   locating a logical solution to an inconsistent ontology;
   updating the inconsistent ontology with the located logical solution;
   embedding an Ontological Web Language (OWL) axiom in a single extended RETE axiom node, wherein the OWL axiom is a class expression, and wherein the single extended RETE axiom node is a stateless RETE subnode that has no local memory associated to it;
   embedding the OWL axiom into a RETE production rule engine; and
   defining new language terms based on tight coupling between the RETE production rule engine and the OWL axiom.

10. The computer program product of claim 9, wherein the method further comprises:
    generating more than one logical solution to the inconsistent ontology; and choosing a logical solution to use when generating said more than one logical solution to the inconsistent ontology.

11. The computer program product of claim 9, wherein ontologies and assertions are loaded into a data structure comprising a logical network of nodes.

12. The computer program product of claim 11, wherein the logical network of nodes is a RETE network that utilizes a RETE algorithm.

13. The computer program product of claim 12, wherein at runtime, logical nodes are associated with a local memory made of tuples, wherein each tuple represents arguments of a fact in the RETE algorithm.

14. The computer program product of claim 9, wherein production rules assertions are executed in order of priority, and wherein logical inconsistencies to the ontology are located in a rule by rule basis.

15. A computer-implemented method comprising:
extending, by one or more processors, a RETE pattern matching algorithm to process production rules written in an Ontological Web Language (OWL) reasoning ontology to form a tight coupling that fully interleaves an OWL reasoning task and matching condition parts of the production rules, wherein the production rules use OWL constructs that require complex reasoning;
implementing, by one or more processors, the tight coupling as a new single engine that implements the OWL constructs with the production rules in a RETE node tree, wherein each node in the RETE node tree corresponds to a condition part of one of the process production rules;
describing and adding, by one or more processors, new RETE nodes dedicated to OWL reasoning to the RETE node tree;
compiling, by one or more processors, the OWL reasoning ontology and the production rules using the extended RETE pattern and RETE node tree having the new RETE nodes that are dedicated to the OWL reasoning ontology.

16. The computer-implemented method according to claim 15, further comprising:
generating, by one or more processors, more than one logical solution; and
choosing, by one or more processors, a logical solution to use when generating said more than one logical solution to an inconsistent ontology.

17. The computer-implemented method according to claim 15, wherein at runtime, logical nodes are associated with a local memory made of tuples, wherein each tuple represents arguments of a fact in a RETE algorithm.

18. The computer-implemented method according to claim 15, wherein production rules are asserted and are executed in order of priority, and wherein logical inconsistencies to the OWL reasoning ontology are located on a rule by rule basis.

* * * * *